US012699381B2

(12) United States Patent
Hussein

(10) Patent No.: US 12,699,381 B2
(45) Date of Patent: Aug. 4, 2026

(54) SYSTEMS, DEVICES, AND METHODS FOR ALLOCATION OF WORKPIECE TRANSFERS IN MULTI-MACHINE, MULTI-PROCESS PRODUCTION SYSTEMS

(71) Applicant: CANON KABUSHIKI KAISHA, Tokyo (JP)

(72) Inventor: Ahmed M. Hussein, Austin, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 414 days.

(21) Appl. No.: 18/475,097

(22) Filed: Sep. 26, 2023

(65) Prior Publication Data

US 2025/0103031 A1 Mar. 27, 2025

(51) Int. Cl.
G05B 19/418 (2006.01)

(52) U.S. Cl.
CPC ... G05B 19/41865 (2013.01); G05B 19/4189 (2013.01); *G05B 2219/39135* (2013.01); *G05B 2219/45031* (2013.01)

(58) Field of Classification Search
CPC .......... G05B 19/41865; G05B 19/4189; G05B 2219/39135; G05B 2219/45031
See application file for complete search history.

(56) References Cited

U.S. PATENT DOCUMENTS

| | | |
|---|---|---|
| 6,074,443 A | 6/2000 | Venkatesh et al. |
| 6,519,498 B1 | 2/2003 | Jevtic et al. |
| 6,714,830 B2 | 3/2004 | Browning |
| 6,865,437 B1 | 3/2005 | Babikian et al. |
| 9,056,394 B2 | 6/2015 | Hazan |
| 9,223,307 B1* | 12/2015 | Wu .......................... G06F 30/22 |
| 10,556,344 B2 | 2/2020 | Hazan |
| 2002/0107599 A1 | 8/2002 | Patel et al. |
| 2003/0158618 A1 | 8/2003 | Browning |
| 2004/0087187 A1 | 5/2004 | Oh |
| 2008/0051930 A1* | 2/2008 | Oh .................... H01L 21/67276 |
| | | 700/214 |
| 2008/0155443 A1 | 6/2008 | Pannese et al. |
| 2008/0216077 A1 | 9/2008 | Emani et al. |
| 2017/0185077 A1 | 6/2017 | Ikeda |
| 2017/0256429 A1* | 9/2017 | Lawson .......... G05B 19/41885 |
| 2018/0311821 A1 | 11/2018 | Schierz et al. |

(Continued)

FOREIGN PATENT DOCUMENTS

CN 103399543 A * 11/2013

*Primary Examiner* — Kenneth M Lo
*Assistant Examiner* — Mohammed Shafayet
(74) *Attorney, Agent, or Firm* — Canon U.S.A., Inc. IP Division

(57) ABSTRACT

Some devices, systems, and methods receive a production-system description that describes respective operations that can be performed on workpieces by each of a plurality of machines and that describes capabilities of one or more robots to transfer the workpieces to and from each of the plurality of machines; receive a process description that describes at least one sequence of process operations to be performed on a workpiece; construct a plurality of transfer chains by recursively generating transfer chains based on a production-system state, the process description, and on the production-system description; and select a particular transfer chain of the plurality of transfer chains based on one or more selection criteria.

20 Claims, 18 Drawing Sheets

(56) References Cited

U.S. PATENT DOCUMENTS

| | | |
|---|---|---|
| 2019/0049937 A1 | 2/2019 | Tetiker et al. |
| 2020/0006100 A1 | 1/2020 | Clark et al. |
| 2025/0173182 A1* | 5/2025 | Yang ................. H01L 21/67276 |

* cited by examiner

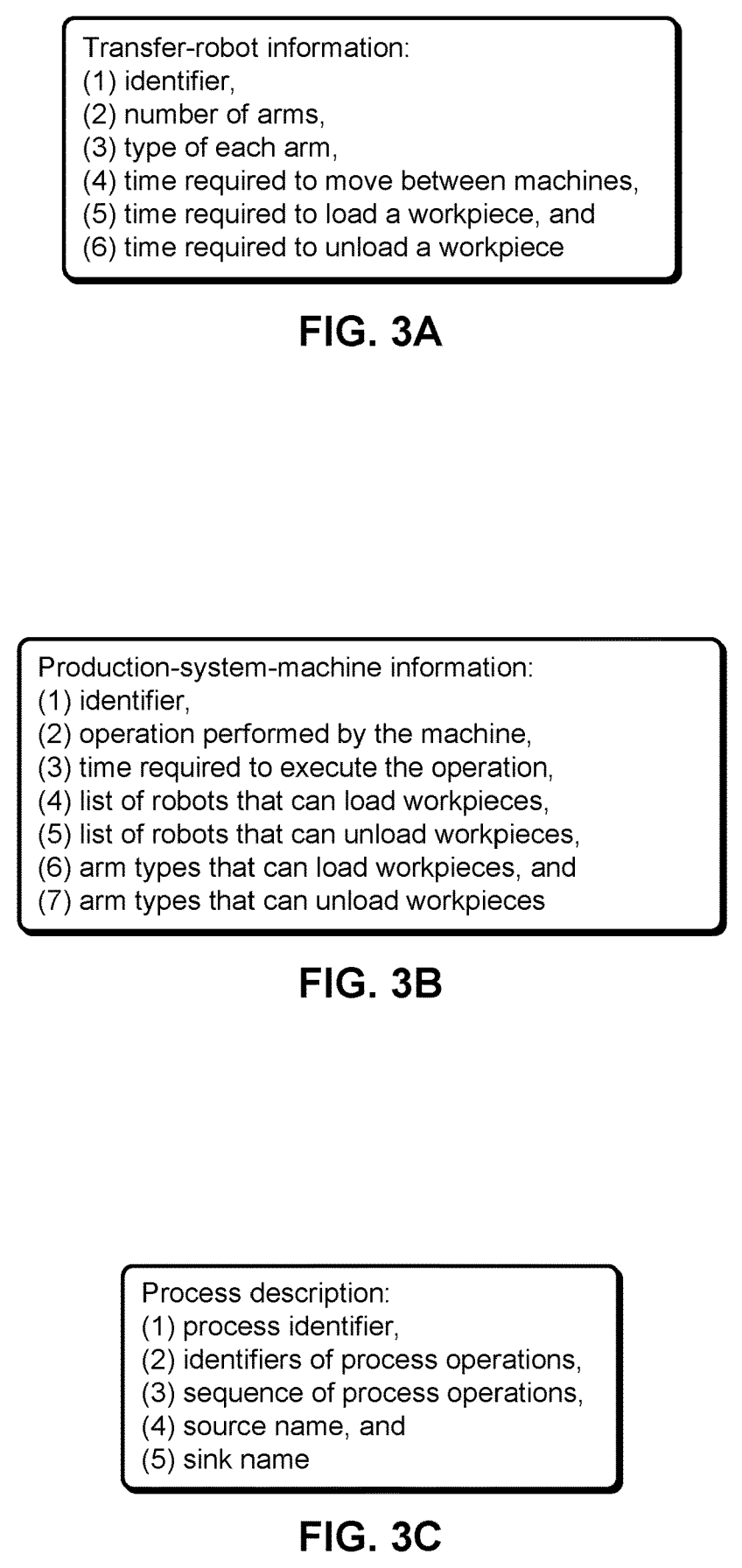

Transfer-robot information:
(1) identifier,
(2) number of arms,
(3) type of each arm,
(4) time required to move between machines,
(5) time required to load a workpiece, and
(6) time required to unload a workpiece

FIG. 3A

Production-system-machine information:
(1) identifier,
(2) operation performed by the machine,
(3) time required to execute the operation,
(4) list of robots that can load workpieces,
(5) list of robots that can unload workpieces,
(6) arm types that can load workpieces, and
(7) arm types that can unload workpieces

FIG. 3B

Process description:
(1) process identifier,
(2) identifiers of process operations,
(3) sequence of process operations,
(4) source name, and
(5) sink name

FIG. 3C

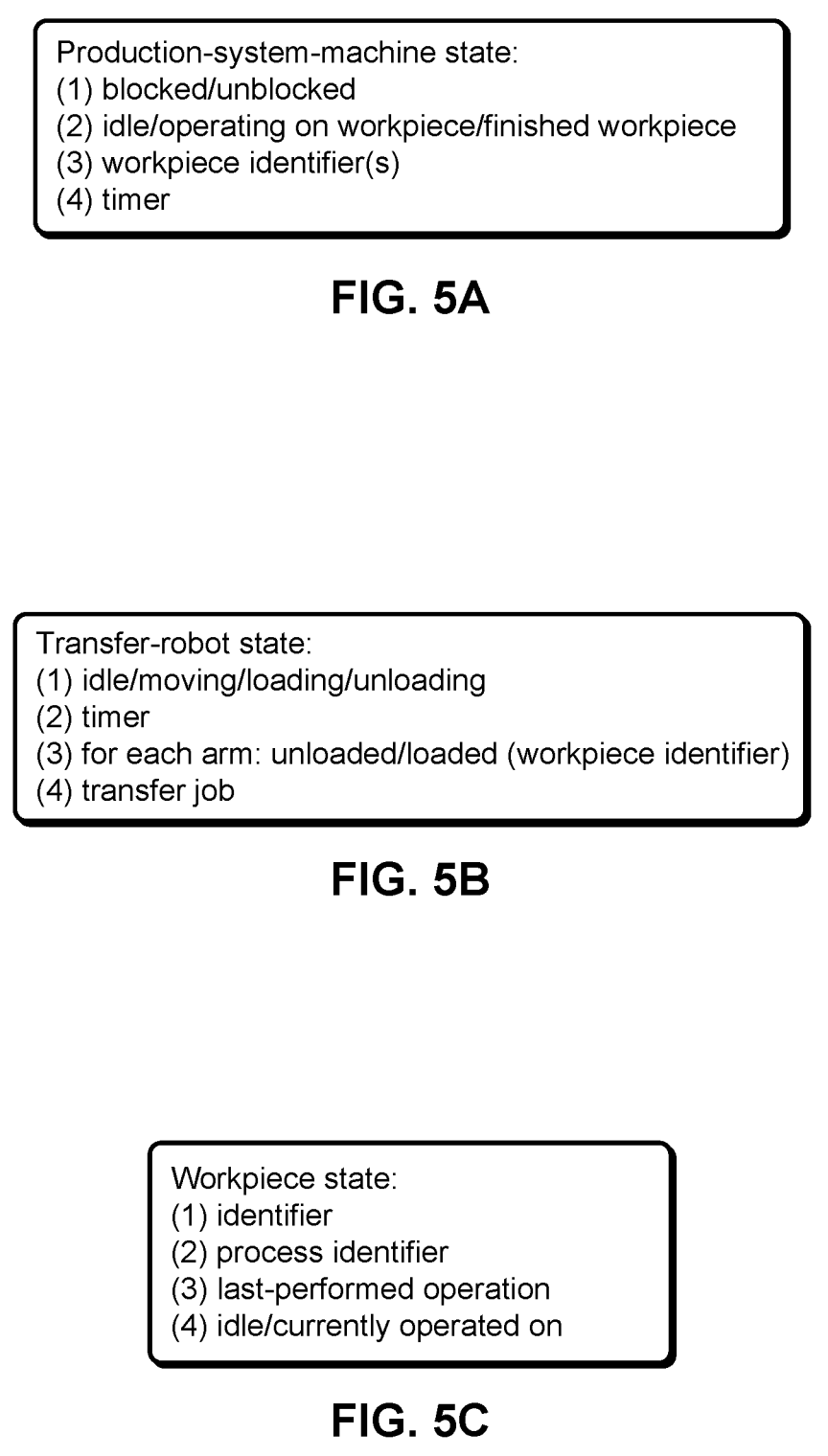

Production-system-machine state:
(1) blocked/unblocked
(2) idle/operating on workpiece/finished workpiece
(3) workpiece identifier(s)
(4) timer

FIG. 5A

Transfer-robot state:
(1) idle/moving/loading/unloading
(2) timer
(3) for each arm: unloaded/loaded (workpiece identifier)
(4) transfer job

FIG. 5B

Workpiece state:
(1) identifier
(2) process identifier
(3) last-performed operation
(4) idle/currently operated on

FIG. 5C

$R_n$->$M_x$
Visit: Swap
$W_y$: $M_x$-->$A_1$; $W_z$: $A_2$-->$M_x$ $R_n$->$M_x$
Visit: Unload
$W_y$: $M_x$-->$A_1$ $R_n$->$M_x$
Visit: Load
$W_y$: $A_1$-->$M_x$

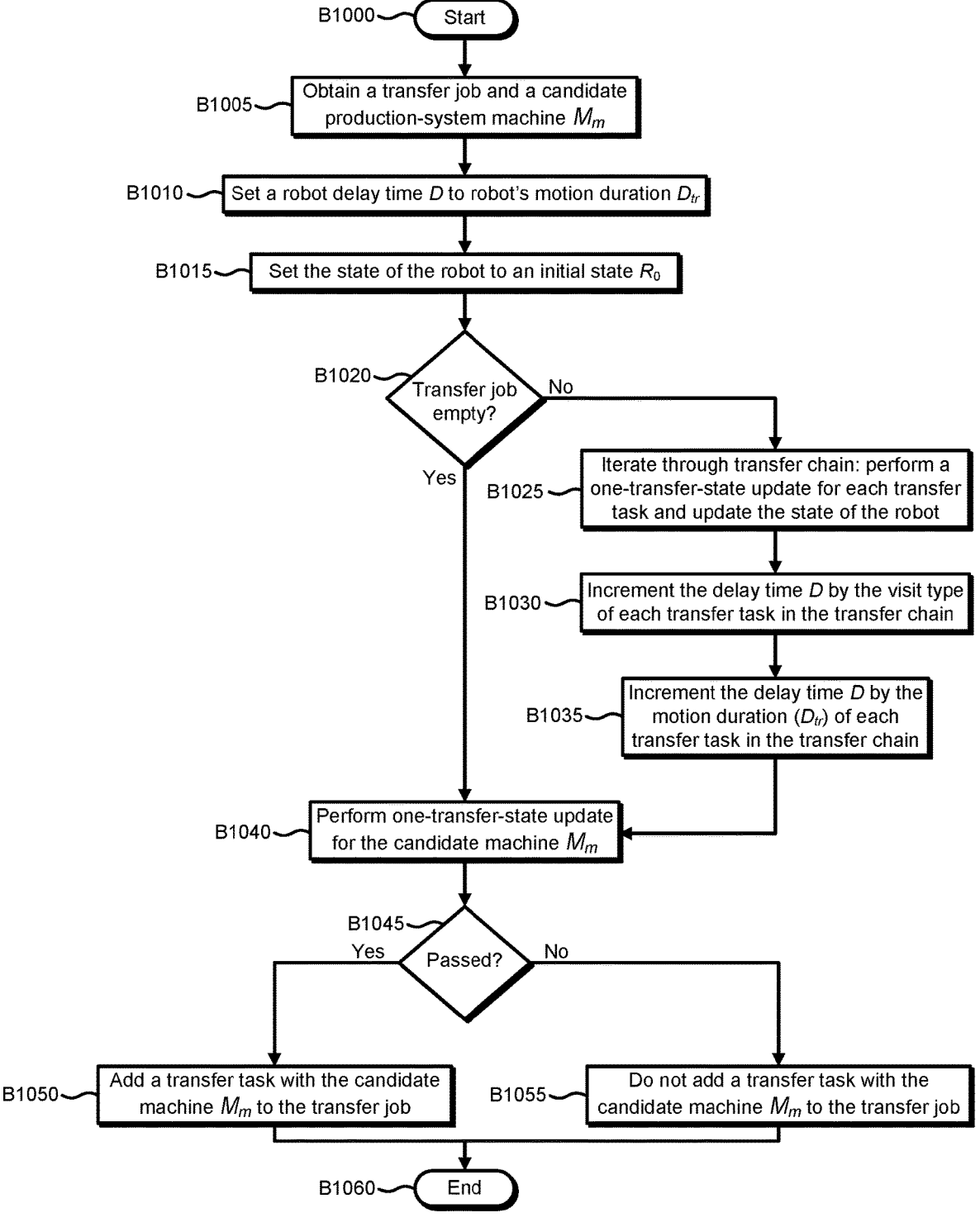

B1000 — Start

B1005 — Obtain a transfer job and a candidate production-system machine $M_m$

B1010 — Set a robot delay time $D$ to robot's motion duration $D_{tr}$

B1015 — Set the state of the robot to an initial state $R_0$

B1020 — Transfer job empty?

No

B1025 — Iterate through transfer chain: perform a one-transfer-state update for each transfer task and update the state of the robot B1030 — Increment the delay time $D$ by the visit type of each transfer task in the transfer chain B1035 — Increment the delay time $D$ by the motion duration $(D_{tr})$ of each transfer task in the transfer chain Yes B1040 — Perform one-transfer-state update for the candidate machine $M_m$ B1045 — Passed?

Yes

No

B1050 — Add a transfer task with the candidate machine $M_m$ to the transfer job B1055 — Do not add a transfer task with the candidate machine $M_m$ to the transfer job B1060 — End

SYSTEMS, DEVICES, AND METHODS FOR ALLOCATION OF WORKPIECE TRANSFERS IN MULTI-MACHINE, MULTI-PROCESS PRODUCTION SYSTEMS

BACKGROUND

Technical Field

This application generally concerns the allocation of workpiece transfers that are performed by robots in multi-machine, multi-process production systems.

Background

A multi-machine production system (MMPS) (e.g., wafer processing tool) is a production system that uses multiple machines to perform operations on workpieces in a fixed order to create a final product. In an MMPS, each machine can perform only one type of operation and the production process involves performing several operations on each workpiece in an order set by the production process. A multi-machine, multi-process production system (MMMPPS) is an MMPS where several distinct processes can be performed simultaneously. The different processes can share some or all of the production system's machines, and each process specifies its own operation sequence. The transfer of workpieces between production machines in either system is performed by transfer robots, each of which can simultaneously carry an arbitrary, but unchanging, maximum number of workpieces.

SUMMARY

Some embodiments of a method of generating a schedule for a plurality of machines and robots comprise receiving a production-system description that describes respective operations that can be performed on workpieces by each of a plurality of machines and that describes capabilities of one or more robots to transfer the workpieces to and from each of the plurality of machines; receiving a process description that describes at least one sequence of process operations to be performed on a workpiece; constructing a plurality of transfer chains by recursively generating transfer chains based on a production-system state, the process description, and on the production-system description, wherein the production-system state describes, at a respective point in time in a series of points in time, at least the following: a respective state of each machine of the plurality of machines; a respective state of each robot of the one or more robots; and a respective state of each workpiece that is held by either a robot of the one or more robots or a machine of the plurality of machines; and selecting a particular transfer chain of the plurality of transfer chains based on one or more selection criteria.

Some embodiments of a system for scheduling workpieces comprise a plurality of machines that are configured to operate on workpieces; a plurality of transfer robots, wherein each transfer robot of the plurality of transfer robots respectively comprises one or more transfer arms that are each configured to carry workpieces; one or more memories; and one or more processors. The one or more processors and the one or more memories are configured to obtain a production-system description that describes respective operations that can be performed on workpieces by each of the plurality of machines and that describes capabilities of the plurality of robots to transfer the workpieces to and from each of the plurality of machines; obtain a process description that describes at least one sequence of process operations to be performed on a workpiece; generate a first plurality of transfer chains by recursively generating transfer chains based on a first production-system state, the process description, and on the production-system description, wherein each transfer chain of the plurality of transfer chains includes a respective sequence of transfer tasks, wherein the first production-system state describes, at a first point in time, at least the following: a respective state of each machine of the plurality of machines, a respective state of each robot of the plurality of robots, and a respective state of each workpiece that is held by either a robot of the one or more robots or a machine of the plurality of machines; and select a first particular transfer chain of the first plurality of transfer chains based on one or more selection criteria.

Some embodiments of a method of generating a schedule for a transfer robot comprise obtaining a production-system description that describes respective operations that can be performed on workpieces by each of a plurality of machines and that describes capabilities of one or more robots to transfer workpieces to and from each of the plurality of machines, wherein the one or more robots include a first robot; obtaining a process description that describes at least one sequence of process operations to be performed on workpieces; generating a future production-system state based on the process description and on the production-system description, wherein the future production-system state describes, at a future point in time, at least the following: a respective state of each machine of the plurality of machines; a respective state of each robot of the one or more robots; and a respective state of each workpiece that is held by either a robot of the one or more robots or a machine of the plurality of machines; generating a plurality of transfer chains for the first robot by generating a plurality of candidate transfer chains based on the future production-system state, the process description, on the production-system description, and on respective future states of the first robot in the plurality of transfer chains, wherein each transfer chain of the plurality of transfer chains includes a respective sequence of transfer tasks; and selecting a particular transfer chain of the plurality of transfer chains based on one or more selection criteria.

BRIEF DESCRIPTION OF THE DRAWINGS

FIG. 3A illustrates an example of transfer-robot information.

FIG. 3B illustrates an example of production-system-machine information.

FIG. 3C illustrates the information that is included in an example embodiment of a process description.

FIG. 5A illustrates an example embodiment of the information that is included in the state of a production-system machine.

FIG. 5B illustrates an example embodiment of the information that is included in the state of a transfer robot.

FIG. 5C illustrates an example embodiment of the information that is included in the state of a workpiece.

FIG. 10 illustrates an example embodiment of an operational flow for performing a one-transfer-addition check.

DESCRIPTION

Figure 1:
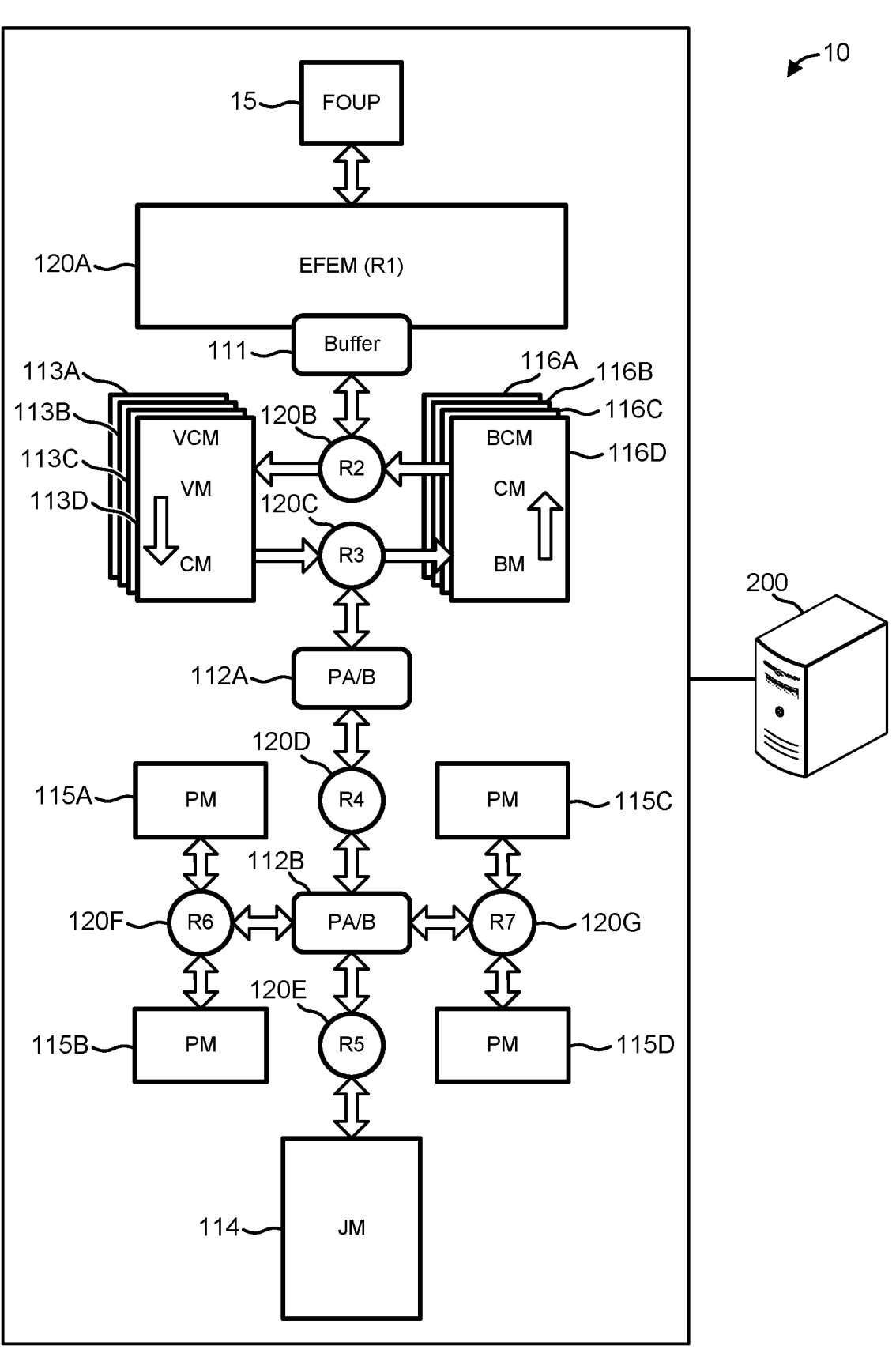
FIG. 1 illustrates an example embodiment of a multi-machine production system (MMPS).

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein. Furthermore, some embodiments include features from two or more of the following explanatory embodiments. Thus, features from various embodiments may be combined and substituted as appropriate.

Also, as used herein, the conjunction "or" generally refers to an inclusive "or," although "or" may refer to an exclusive "or" if expressly indicated or if the context indicates that the "or" must be an exclusive "or."

Moreover, as used herein, the terms "first," "second," and so on, do not necessarily denote any ordinal, sequential, or priority relation and may be used to more clearly distinguish one member, operation, element, group, collection, set, region, section, etc. from another without expressing any ordinal, sequential, or priority relation. Thus, a first member, operation, element, group, collection, set, region, section, etc. discussed below could be termed a second member, operation, element, group, collection, set, region, section, etc. without departing from the teachings herein.

And in the following description and in the drawings, like reference numbers designate identical or corresponding members throughout the several views.

Additionally, in this description and the drawings, an alphabetic suffix on a reference number may be used to indicate a specific instance of the feature identified by the reference number. For example, the planarization machines in a group of planarization machines may be identified with the reference number 115 when a specific planarization machine is not being distinguished. However, 115A may be used to identify a specific planarization machine when the specific planarization machine is being distinguished from the rest of the planarization machines 115.

FIG. 1 illustrates an example embodiment of a multi-machine production system (MMPS) 10. The MMPS 10 includes production-system machines, transfer robots 120 (robots R1, R2, R3, R4, R5, R6, and R7), and at least one control device 200. The MMPS 10 may also be an MMMPPS. Also, transfer robot R1 (120A) is an equipment front-end machine (EFEM), which can load and unload workpieces from a Front Opening Unified Pod (FOUP) 15.

In this embodiment, the production-system machines include the following: a buffer 111, two auto-aligner buffers (PA/Bs) 112, four vapor-cooling machines (VCMs) 113, each of which is a combination of a vapor-coating machine (VM) and a cooling machine (CM); a jetting machine (JM) 114; four planarization machines (PMs) 115; and four baking-cooling machines (BCMs) 116, each of which is a combination of a baking machine (BM) and a cooling machine (CM). Each of the production-system machines can receive workpieces and perform operations on the workpieces. As shown in FIG. 1, the MMPS 10 may have multiple production-system machines that perform the same operation.

Each transfer robot 120 can carry an arbitrary, but fixed, number of workpieces at a time and can move between a subset of the production-system machines. Depending on the embodiment, the subset may include all of the production-system machines or, alternatively, the subset may be a proper subset of the production-system machines. Each transfer robot 120 has one or more arms, each of which has a certain fixed type and can carry a single workpiece at a time. Examples of types of arms include the following: an arm adapted for holding a wafer, an arm for holding a wafer in a controlled atmosphere, an arm adapted for preventing evaporation of droplets of resist on a wafer, an arm adapted for holding a superstrate used in a PM, an arm adapted for cooling a wafer, and an arm adapted for two or more of these types. Multiple transfer robots 120 can have arms of the same type.

The arrows between the production-system machines and the transfer robots 120 indicate the directions in which workpieces can travel. A one-directional arrow between a transfer robot 120 and a production-system machine indicates that a workpiece can travel only in the direction of the arrow (i.e., the transfer robot 120 can either load or, alternatively, unload the production-system machine, but not both). A bi-directional arrow between a transfer robot 120 and a production-system machine indicates that a workpiece can travel in either direction (i.e., the transfer robot 120 can both load and unload the production-system machine). One or more of the transfer robots 120 will transfer workpieces to and from FOUPs, and through a series of production-system machines.

Examples the transfer robots 120 include the positioning systems that are described in U.S. Publication No. 2023/0152688 and the end effectors that are described in U.S. Publication No. 2023/0137182, which are incorporated by reference herein for purposes of describing the transfer robots 120.

Examples of workpieces include substrates, such as wafers. The MMPS 10 may receive input workpieces, process the input workpieces, and then output the processed workpieces. Examples of processed workpieces include semiconductor devices.

Transfer robot R1 (120A), which is an EFEM, can unload workpieces (e.g., wafers) from a FOUP 15 and convey the workpieces to the optional buffer 111. A typical MMPS 10 will have load ports for 1 to 6 FOUPs. A source is the source of the workpieces that are provided to a process, and the sink is the destination of the workpieces that are completed by a process. In the example in FIG. 1, a FOUP 15 is the source and a FOUP 15 is the sink (and the source FOUP 15 and the sink FOUP 15 may be the same FOUP or different FOUPs). Also, some embodiments do not include the buffer 111 or the PA/Bs 112.

Transfer robot R1 (120A) conveys the workpieces to the buffer 111, and the buffer 111 holds the workpieces until transfer robot R2 (120B) can unload them. Also, the buffer 111 and transfer robot R1 (120A) can received completed workpieces from transfer robot R2 (120B), and transfer robot R1 (120A) can load the completed workpieces into a FOUP 15.

The two PA/Bs 112 adjust the prealignment states of workpieces. For example, the PA/Bs 112 may align a workpiece using a notch, an orientation flat, or the like formed in the workpiece. The PA/B may be a wafer pre-aligner. The transfer robot will load the workpiece onto one of the PA/Bs. The PA/B will detect the orientation of the workpiece using optical mechanical means to identify a location of an orientation notch or flat. The PA/B will then adjust the orientation of the workpiece so that when it is removed from the PA/B by the transfer robot it is in a known orientation. In an alternative embodiment, the PA/B sends instructions to the transfer robot to remove the workpiece so that is in a specific known orientation. Additionally, the PA/Bs 112 may hold workpieces as the workpieces are transferred between transfer robots 120. Also, in some embodiments, the buffer 111 is a PA/B.

The vapor-coating machines (VMs) of the VCMs 113 apply a vapor coating to workpieces. The VCMs 113 then transfer the workpieces to the cooling machines (CMs), which cool the workpieces. In some embodiments, the VMs are separate from the CMs, and a transfer robot transfers the workpieces from the VMs to the CMs. Also, in this embodiment, the VCMs 113 are arranged in a stack. A typical MMPS 10 will have 1-10 VCMs 113.

The jetting machine (JM) 114 applies drops of formable material (e.g., resist) to workpieces, for example according to one or more drop patterns. Examples of the JM 114 include the dispensing systems and dispensing stations that are described in U.S. Pat. No. 11,526,076, U.S. Publication No. 2022/0115259, and U.S. Publication No. 2023/0152688, which are incorporated by reference herein for purposes of describing the JM 114. A typical MMPS 10 will have 1-3 JMs 114.

Each planarization machine (PM) 115 performs a planarization process on a workpiece. Examples of the PM 115 are described in U.S. Pat. No. 11,526,076, U.S. Publication No. 2022/0115259, and U.S. Publication No. 2023/0152688, which are incorporated by reference herein for purposes of describing the PM 115. A typical MMPS 10 will have 1-10 PMs 115.

Some embodiments of the baking-cooling machines (BCMs) 116 both bake (heat) and cool workpieces. And in some embodiments, the baking machines (BMs) of the baking-cooling machines (BCMs) 116 bake (heat) workpieces (and the BMs may partially cool the workpieces), and the BCMs 116 then transfer the workpieces to the cooling machines (CMs), which cool the workpieces. In some embodiments, the BMs are separate from the CMs, and a transfer robot transfers the workpieces from the BMs to the CMs. Also, in this embodiment, the BCMs 116 are arranged in a stack. Examples of a BM include the reaction chambers that are described in U.S. Publication No. 2023/0168592, which is incorporated by reference herein for purposes of describing a BM. And examples of a BCM 116 are described in U.S. Publication No. 2023/0137182, which is incorporated by reference herein for purposes of describing a BCM 116. A typical MMPS 10 will have 1-10 BCMs 116.

The embodiment of an MMPS 10 in FIG. 1 is an example, and some embodiments have other configurations. For example, some embodiments include different production-system machines in addition to, or in alternative to, the production-system machines shown in FIG. 1; some embodiments have different arrangements of the production-system machines; some embodiments include more or fewer transfer robots 120; some embodiments include different arrangements of transfer robots 120; and some embodiments include different types of transfer robots.

Figures 9A, 9B, 9C, 9D:
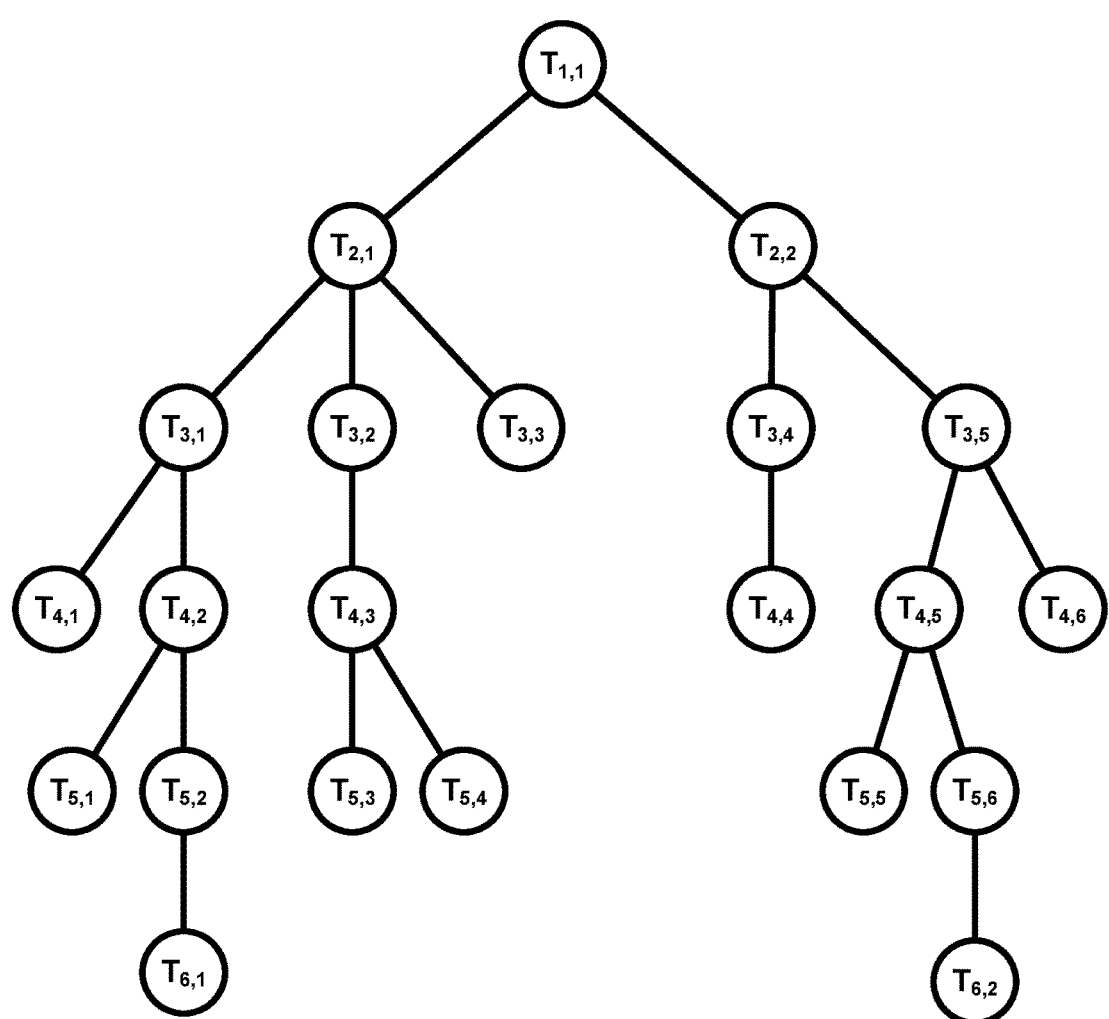
FIGS. 9A-C illustrate example embodiments of transfer tasks.
FIG. 9D illustrates an example embodiment of the descendant transfer chains of a transfer job.

The control device 200 controls the operations of the system 10, and the control device 200 communicates with the production-system machines and the transfer robots 120 via wired or wireless communication. Also, the control device 200 may generate a process schedule for the system, or the control device 200 may cooperate with the robots 120 to generate a process schedule for the system. A process schedule includes one or more transfer jobs for each of the transfer robots. And a transfer job is composed of a chain (sequence) of workpiece transfers tasks (transfer tasks) to or from production-system machines. The same production-system machine can be visited multiple times in the same transfer chain. A workpiece transfer task (transfer task) in a transfer job indicates a production-system machine, an operation (load, unload, swap), any arms of the transfer robot that are loading or unloading workpieces, and the workpiece identifiers of any workpieces that are being loaded or unloaded. FIGS. 9A-C, which are described below, illustrate example embodiments of transfer tasks.

Figure 2:
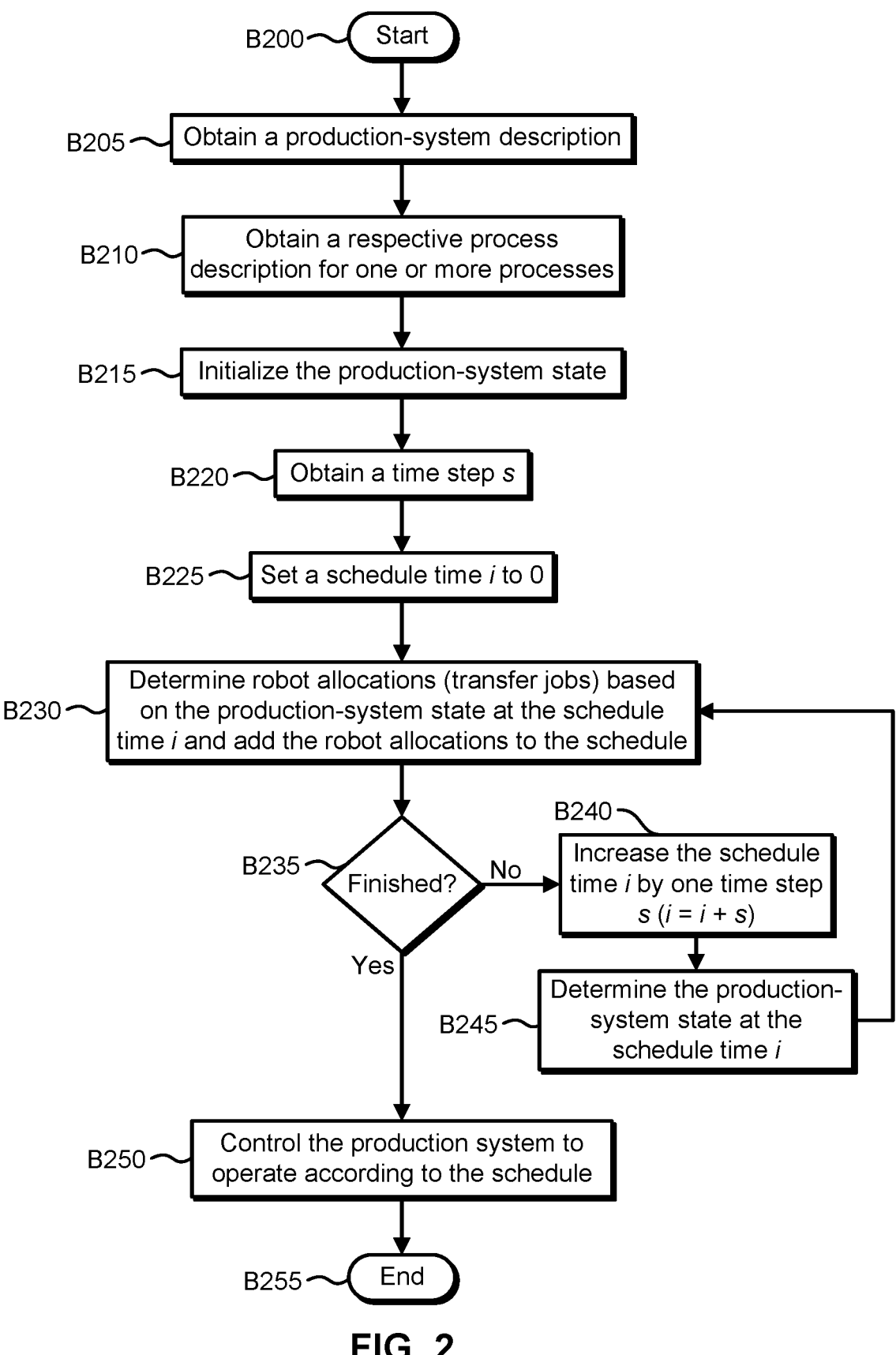
FIG. 2 illustrates an example embodiment of an operational flow for generating a schedule for a production system.

FIG. 2 illustrates an example embodiment of an operational flow for generating a schedule for a production system (e.g., a MMPS). Although this operational flow and the other operational flows that are described herein are each presented in a certain order, some embodiments may perform at least some of the operations in different orders than the presented orders. Examples of different orders include concurrent, parallel, overlapping, reordered, simultaneous, incremental, and interleaved orders. Thus, other embodiments of the operational flows that are described herein may omit blocks, add blocks, change the order of the blocks, combine blocks, or divide blocks into more blocks.

Furthermore, although this operational flow and at least parts of the operational flows that are described in FIGS. 6, 7, 8, 10, 11, 12, and 13 are performed by a control device 200, in some embodiments, at least part of these operational flows are performed by two or more control devices 200, by one or more other specially-configured computing devices, or by one or more transfer robots 120.

The flow starts in B200 and moves to B205, where the control device 200 obtains a production-system description (e.g., from storage, from a server, from user entry). The production-system description includes transfer-robot information for each robot and production-system-machine information for each production-system machine. For example, FIG. 3A illustrates an example of transfer-robot information, and FIG. 3B illustrates an example of production-system-machine information.

In FIG. 3A, the transfer-robot information includes the following: an identifier of the transfer robot, the number of arms that the transfer robot has, the type of each arm, the time required to move between production-system machines, the time required to load (mount) a workpiece, and the time required to unload (unmount) a workpiece.

In FIG. 3B, the production-system-machine information includes the following: an identifier, a name or identifier of the operation or operations that are performed by the production-system machine, the time (or times) required to perform the operation or operations, a list of transfer robots that can load workpieces, a list of transfer robots that can unload workpieces, arm types that can load workpieces, and arm types that can unload workpieces. For a production-system machine that is a combination of two or more production-system machines (e.g., a VCM 113, a BCM 116), the production-system-machine information may include the production-system-machine information for each component production-system machine.

Also, for a production-system machine that is a buffer (e.g., the buffer 111, the PA/Bs 112), the time required to execute a buffering operation may be 0 seconds.

And the control device 200 may represent a FOUP as if the FOUP is a production-system machine, and thus may generate production-system-machine information for a FOUP. The operation of the FOUP may be a 'storing' operation, and the time required for a FOUP to execute a 'storing' operation may be 0 seconds. Also, the production-system-machine information for a FOUP may indicate the workpieces that are currently stored in the FOUP.

Also, the production-system-machine information for transfer robot that is an EFEM may indicate how quickly the EFEM 110 can supply new workpieces and how quickly the EFEM can accept completed workpieces.

Next, in block B210, the control device 200 obtains a respective process description for one or more processes. FIG. 3C illustrates the information that is included in an example embodiment of a process description. The information includes an identifier, identifiers of the operations that are performed by the process, a sequence of the operations that are performed by the process, a source name, and a sink name. A source is the source of the workpieces that are provided to the process, and the sink is the destination of the workpieces that are completed by the process.

Also, a process description may be represented in the form of a flow graph (e.g., a directed acyclic graph). And, in block B210, the control device 200 may obtain process descriptions in the form of a flow graph or generate a flow graph based on the process descriptions.

Figure 4:
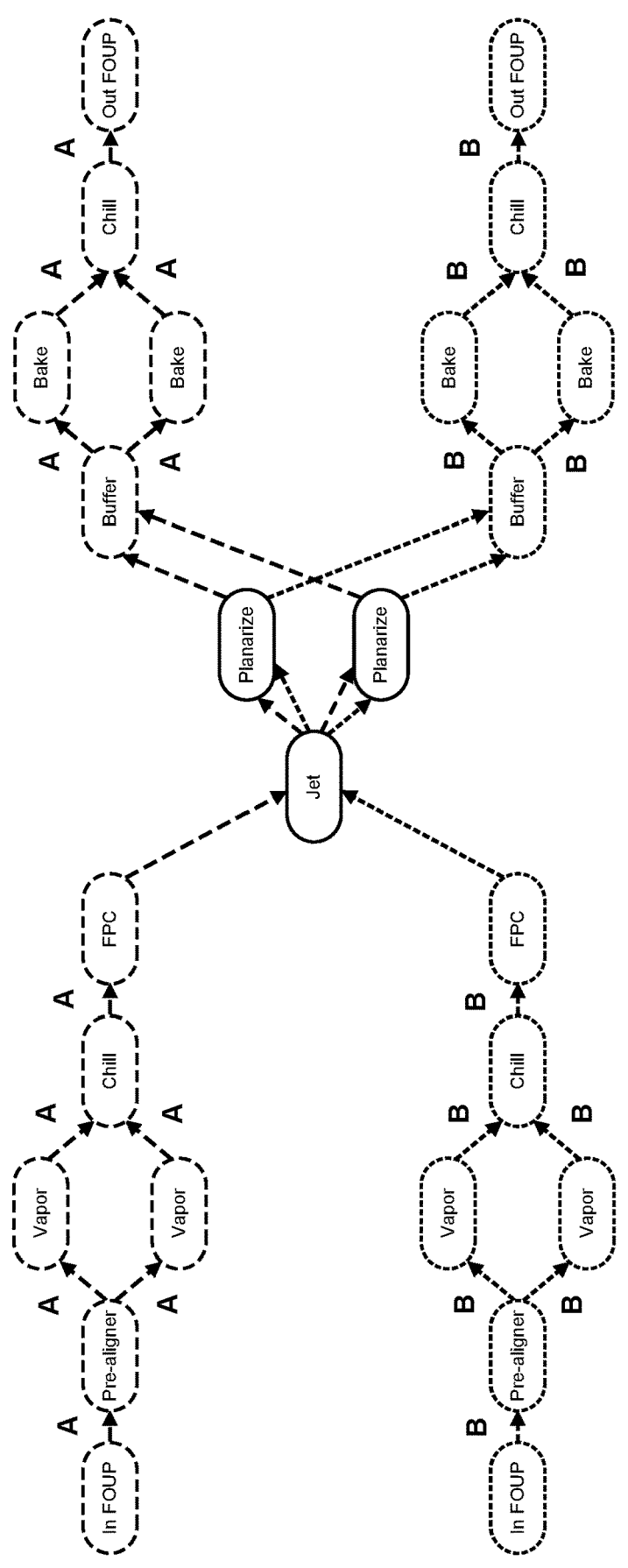
FIG. 4 illustrates an example embodiment of a directed acyclic graph that was generated based on the process descriptions of two processes.

For example, FIG. 4 illustrates an example embodiment of a directed acyclic graph that was generated based on, and represents, the process descriptions of two processes, process A and process B. In FIG. 4, every node is a production-system machine except the source and sink nodes, which are FOUPs. The nodes are connected by edges that have arrows, and the arrows indicate the flow of workpieces between the two ends of the respective edge. Thus, a directed edge connecting two nodes (e.g., machines) indicates that workpieces coming out of the machine of the node at the start of the edge can be transferred to the machine of the node at the end of the edge. Furthermore, source nodes do not have any incoming edges, and sink nodes do not have any outgoing edges. Because multiple machines can perform the same operation, the number of edges going into a node or coming out of a node can be one or more. To distinguish the processes from each other, the dash type of each arrow indicates the process to which each arrow belongs. Also, in FIG. 4, some of the production-system machines—the jetting machine 114 and the planarization machines 115—are shared by both processes.

Note that if node Y is reachable from node X, that does not necessarily mean that workpieces flowing out of node X can go to node Y. This would true if only one process is represented. For multiple processes, the flow of workpieces between nodes is constrained by node reachability in addition to the process requirements. For example, in some embodiments of a two-process flow graph, workpieces processed on node X can go to node Y in one process but not in the other.

The flow then proceeds to block B215, where the control device 210 initializes the production-system state, which includes the respective state of every production-system machine, transfer robot, and workpiece in the production system.

For example, FIG. 5A illustrates an example embodiment of the information that is included in the state of a production-system machine. The information includes the blocked status, which is either blocked or unblocked; the operating status, which is either 'idle,' 'operating on a workpiece,' or 'holding a finished workpiece'; the workpiece identifier of any workpiece that is held by the production-system machine; and a timer. During the initialization in block B215, the blocked status is set to unblocked, the operating status is set to 'idle,' the timer is set to zero, and there is no workpiece identifier unless the production-system machine is a source. If the production-system machine is a source (e.g., a FOUP), then the workpiece identifiers are set to the workpieces that are held by the production-system machine and the respective states of the workpieces are initialized.

FIG. 5B illustrates an example embodiment of the information that is included in the state of a transfer robot. The information includes the operating status, which can be one of the following: 'idle,' 'moving,' 'loading,' and 'unloading'; a timer; and the status of each arm, which can be either loaded or unloaded. Also, if an arm is loaded, the information includes the identifier of the workpiece that is held by the arm. During the initialization in block B215, the operating status is set to idle, the timer is set to zero, and each arm is set to unloaded. Furthermore, when the transfer robot has a transfer job, the information includes the transfer job, although initially the transfer robot does not have a transfer job.

FIG. 5C illustrates an example embodiment of the information that is included in the state of a workpiece. The information includes an identifier of the workpiece; a process identifier, which identifies the process that is to be performed on the workpiece; the last-performed operation; and the operating status, which may be 'idle' or 'currently operated on'. During initialization, the last-performed operation is set to 'none,' and the operating status is set to 'idle.'

The flow then advances to block B220, where the control device 200 obtains a time step s, for example from user entry, from another computing device, or from calculations based on the production-system description or the one or more process descriptions. And, in block B225, the control device 200 sets a schedule time i to zero (i=0).

Next, in block B230, the control device 200 determines robot allocations based on the production-system state at the schedule time i and adds the robot allocations to the schedule. For example, some embodiments of block B230 determine the robot allocations as described by the operational flow in FIG. 8.

The flow then moves to block B235, where the control device 200 determines whether the schedule is finished. For example, the control device 200 may determine that the schedule is finished based on whether the schedule has been completed for a predetermined number of workpieces or for a predetermined interval of time. Also, if the control device 200 is operating while the MMPS 10 is operating (e.g., operating in real time), then the control device 200 may determine that the schedule is finished when a stop instruction is received.

If the schedule is not finished (B235=No), then the flow moves to block B240, where the control device 200 increases the schedule time i by one time step s (i=i+s), and the flow proceeds to block B245.

In block B245, the control device 200 determines the production-system state at the schedule time i. Additionally, some embodiments of block B245 include one or both of the operational flows in FIG. 6 and FIG. 7.

If the schedule is finished (B235=Yes), then the flow moves to block B250. In block B250, the control device 200 controls the MMPS 10 to operate according to the schedule. And, in some embodiments, the control device 200 stores or outputs the schedule in addition to, or in alternative to, controlling the MMPS 10 to operate according to the schedule. And the flow then ends in block B255.

If the schedule is generated before the MMPS 10 starts to process workpieces, then the schedule may be stored by the control device 200 and then used during the operation of the MMPS 10. For batch processing of workpieces, blocks B230-B245 may be repeated until the robot allocations converge to a periodic, repeating pattern, and then the schedule could be continuously executed. If the control device 200 generates the schedule while the MMPS 10 is operating, then blocks B230-B245 may be performed in real time for both a continuous stream of workpieces and batch processing of workpieces.

Figure 6:
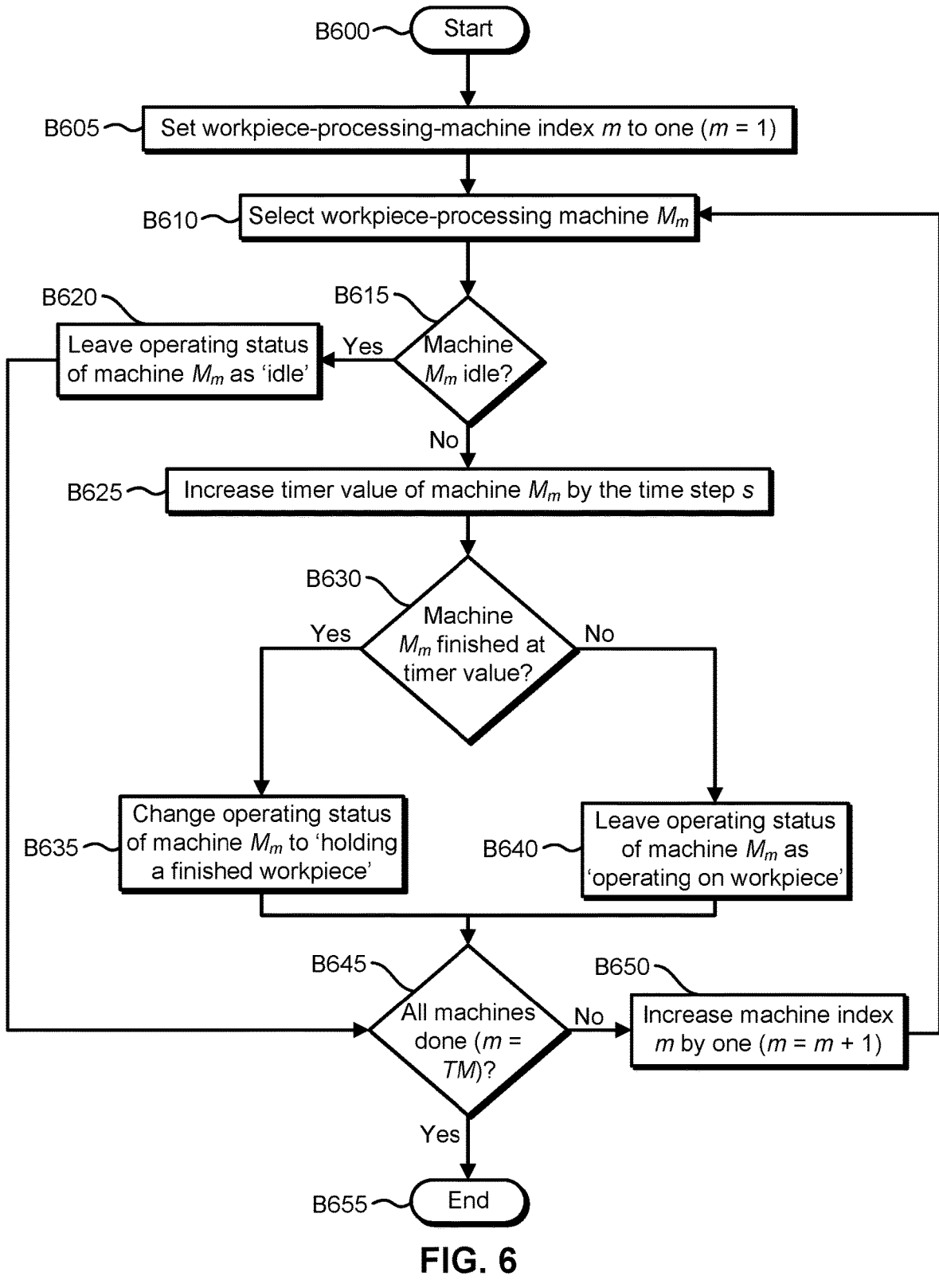
FIG. 6 illustrates an example embodiment of an operational flow for determining the states of production-system machines.

FIG. 6 illustrates an example embodiment of an operational flow for determining the states of production-system machines. The flow starts in block B600 and proceeds to block B605.

In block B605, the control device 200 sets a production-system-machine index m (machine index m) to one (m=1). Then, in block B610, the control device 200 selects production-system machine $M_m$. The flow then moves to block B615, where the control device 200 determines whether the operating status of production-system machine $M_m$ is 'idle' based on the current state of production-system machine $M_m$.

Additionally, if machine $M_m$ is a FOUP, then the operating status may always be set to 'idle.'

If the control device 200 determines that the operating status of production-system machine $M_m$ is 'idle' (B615=Yes), then the flow moves to block B620, where the control device 200 leaves the operating status of production-system machine $M_m$ as 'idle.' The flow then proceeds to block B645.

Also, in block B620, the control device 200 may determine if a source (FOUP) contains any workpieces or if a sink (FOUP) has been filled with workpieces. If a source has no more workpieces, then the control device 200 may remove the source and add another source that has workpieces. At this time, the control device 200 may generate and initialize a respective workpiece state for each workpiece in the just-added source. If a sink has been filled with workpieces, then the control device 200 may remove the sink and a sink that has not been filled with workpieces (e.g., an empty sink). The control device 200 may send instructions for an operator, a FOUP handling robot, and/or an overhead FOUP conveyance system to remove and/or supply a FOUP to/from a FOUP load port of the multi-machine production system 10.

If the control device 200 determines that the operating status of production-system machine $M_m$ is not 'idle' (B615=No), then the flow advances to block B625.

In block B625, the control device 200 increases the timer value of production-system machine $M_m$ by the time step s. The timer value of production-system machine $M_m$ will be increased by the time step s each time block B625 is performed. Thus, after three iterations of block B625, and where the initial value of the timer is v, the value of the timer would be v+3 s. Also, if the timer value of production-system machine $M_m$ is reset, then the timer value will begin at zero (i.e., the initial value v will be zero) and increase each time block B625 is performed on the timer value after the reset.

Next, in block B630, the control device 200 determines whether production-system machine $M_m$ will be finished at the current timer value (which was increased by the time step s in block B625) based on the production-system-machine description of production-system machine $M_m$ (which indicates the time required for production-system machine $M_m$ to perform an operation). If production-system machine $M_m$ will be finished at the current timer value (B630=Yes), then the flow moves to block B635, where control device changes the operating status of production-system machine $M_m$ to 'holding a finished workpiece.'

If machine $M_m$ is a buffer, and thus has an operation time of 0 seconds, then after any time step s, no matter how small, the operating status of a buffer that holds a workpiece will be changed to 'holding a finished workpiece.'

And the flow then proceeds to block B645.

If production-system machine $M_m$ will not be finished at the current timer value (B630=No), then the flow moves to block B640, where the control device leaves the operating status of production-system machine $M_m$ as 'operating on workpiece.' And the flow then proceeds to block B645.

In block B645, the control device 200 determines whether the respective state of every production-system machine has been updated (e.g., whether m=TM, where TM is the total number of production-system machines). If the respective state of every production-system machine has not been updated (B645=No), then the flow moves to block B650, where the control device 200 increases the machine index m by one (m=m+1), and the flow returns to block B610. If the respective state of every production-system machine has been updated (B645=Yes), then the flow ends in block B655.

Figure 7:
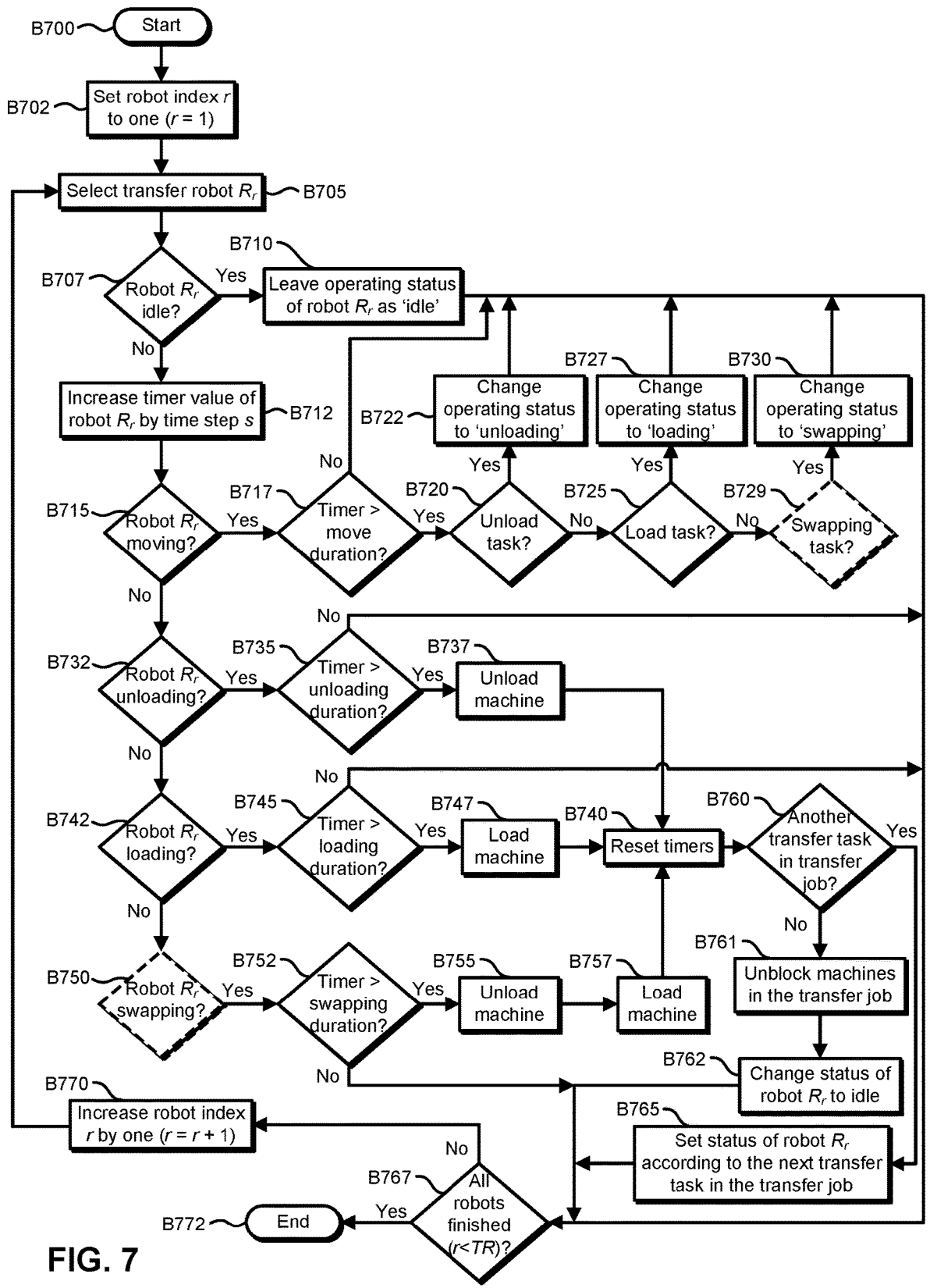
FIG. 7 illustrates an example embodiment of an operational flow for determining the states of transfer robots.

FIG. 7 illustrates an example embodiment of an operational flow for determining the states of transfer robots. The flow starts in block B700 and moves to block B702, where a control device 200 sets a transfer-robot index (robot index) r to 1. Next, in block B705, the control device 200 selects transfer robot $R_r$. The flow then moves to block B707, where the control device 200 determines whether the operating status of transfer robot $R_r$ is 'idle.' If the operating status of transfer robot $R_r$ is 'idle' (B707=Yes), then the flow moves to block B710, where the control device 200 leaves the operating status of transfer robot $R_r$ as 'idle.' The flow then proceeds to block B767.

If the operating status of transfer robot $R_r$ is not 'idle' (B707=No), then the flow proceeds to block B712. Also, if the operating status of transfer robot $R_r$ is not 'idle,' then transfer robot $R_r$ is currently executing a transfer job. Thus, if the operating status of transfer robot $R_r$ is not 'idle,' transfer robot $R_r$ is performing a transfer task, and is thus either moving, loading a workpiece, unloading a workpiece, or swapping workpieces according to a transfer task in a transfer job.

In block B712, the control device increases the timer value of transfer robot $R_r$ by the time step s. The timer value of transfer robot $R_r$ will be increased by the time step s each time block B712 is performed on the timer value. Thus, after two iterations of block B712, and where the initial value of the timer is v, the value of the timer would be v+2 s. Also, if the timer value of transfer robot $R_r$ is reset (e.g., in block B740), then the timer value will begin at zero and increase each time block B712 is performed on the timer value after the reset.

Next, in block B715, the control device 200 determines whether the operating status of transfer robot $R_r$ is 'moving.' If the operating status of transfer robot $R_r$ is 'moving' (B715=Yes), then the flow moves to block B717.

In block B717, the control device 200 determines whether the timer value is greater than the move duration of transfer robot $R_r$ based on the transfer-robot information of transfer robot $R_r$. If the timer value is not greater than the move duration (B717=No), then the flow moves to block B767. If the timer value is greater than the move duration (B717=Yes), then the flow proceeds to block B720.

In block B720, the control device 200 determines whether the next transfer task in the current transfer job of transfer robot $R_r$ is an unload task. If the next transfer task in the current transfer job of transfer robot $R_r$ is an unload task (B720=Yes), then the flow advances to block B722, where the control device 200 changes the operating status of transfer robot $R_r$ to 'unloading.' The flow then moves to block B767. If the next transfer task in the current transfer job of transfer robot $R_r$ is not an unload task (B720=No), then the flow moves to block B725.

In block B725, the control device 200 determines whether the next transfer task in the current transfer job of transfer robot $R_r$ is a load task. If the next transfer task in the current transfer job of transfer robot $R_r$ is a load task (B725=Yes), then the flow proceeds to block B727, where the control device 200 changes the operating status of transfer robot $R_r$ to 'loading.' And the flow then advances to block B767. If the next transfer task in the current transfer job of transfer robot $R_r$ is not a load task (B725=No), then the flow moves to block B729.

In block B729, the control device 200 determines that the next transfer task is a swapping task, and the flow then moves to block B730. In block B730, the control device 200 changes the operating status of transfer robot $R_r$ to 'swapping.' And the flow then moves to block B767. Also, some embodiments omit block B729, and the flow proceeds from block B725 directly to block B730 in response to a 'No' determination in block B725. To be able to perform a swapping task, a transfer robot must have at least 2 arms.

If in block B715 the operating status of transfer robot $R_r$ is not 'moving' (B715=No), then the flow moves to block B732.

In block B732, the control device 200 determines whether the operating status of transfer robot $R_r$ is 'unloading.' If the operating status of transfer robot $R_r$ is 'unloading' (B732=Yes), then the flow moves to block B735.

In block B735, the control device 200 determines whether the timer value is greater than the unloading duration of transfer robot $R_r$ based on the transfer-robot information of transfer robot $R_r$. If the control device 200 determines that the timer value is not greater than the unloading duration (B735=No), then the flow moves to block B767. If the control device 200 determines that the timer value is greater than the unloading duration (B735=Yes), then the flow proceeds to block B737.

In block B737, the control device 200 sets the operating status of the production-system machine to 'idle' and removes the workpiece identifier. And the control device 200 updates the state of the workpiece. This includes changing the last-performed operation to the operation that was performed by the production-system machine, unless the production-system machine is a buffer, in which chase the control device 200 does not change the last-performed operation. Additionally, updating the state includes changing the operating status of the workpiece to 'idle.' This marks the workpiece as a workpiece that needs to advance to a production-system machine that performs the next operation in the workpiece's process, which places a constraint on which production-system machines the workpiece can advance to. Also, the control device 200 updates the state of transfer robot $R_r$ by adding the workpiece identifier to the arm of transfer robot $R_r$ that holds the workpiece.

Also, if transfer robot $R_r$ is unloading a source FOUP (e.g., transfer robot $R_r$ is an EFEM), then the control device 200 may generate and initializes the state of the unloaded workpiece if the state has not already been generated an initialized.

The flow then advances to block B740.

If in block B732 the operating status of transfer robot $R_r$ is not 'unloading' (B732=No), then the flow moves to block B742. In block B742, the control device 200 determines whether the operating status of transfer robot $R_r$ is 'loading.' If the operating status of transfer robot $R_r$ is 'loading' (B742=Yes), then the flow moves to block B745.

In block B745, the control device 200 determines whether the timer value is greater than the loading duration of transfer robot $R_r$ based on the transfer-robot information of transfer robot $R_r$. If the timer value is not greater than the loading duration (B745=No), then the flow moves to block B767. If the timer value is greater than the loading duration (B745=Yes), then the flow proceeds to block B747.

In block B747, the control device 200 sets the operating status of the production-system machine to 'operating on workpiece,' adds the workpiece identifier to the state of the production-system machine, and updates the state of the workpiece by changing the operating status to 'currently operated on.' Also, the control device 200 updates the state of transfer robot $R_r$ by removing the workpiece identifier from the arm of transfer robot $R_r$ that held the workpiece. And, if transfer robot $R_r$ is loading the workpiece into a sink FOUP (e.g., transfer robot $R_r$ is an EFEM), then the control device 200 may change the operating status of the workpiece to 'complete' and add the workpiece identifier to the FOUP's information.

The flow then proceeds to block B740.

If in block B742 the operating status of transfer robot $R_r$ is not 'loading' (B742=No), then the flow moves to block B750. In block B750, the control device 200 determines that the operating status of transfer robot $R_r$ is 'swapping.' And the flow then moves to block B752. Also, some embodiments omit block B750, and the flow proceeds from block B742 directly to block B752 in response to a 'No' determination in block B742.

In block B752, the control device 200 determines whether the timer value is greater than the swapping duration of transfer robot $R_r$ based on the transfer-robot information of transfer robot $R_r$. If the timer value is not greater than the swapping duration (B752=No), then the flow advances to block B767. If the timer value is greater than the swapping duration (B752=Yes), then the flow proceeds to block B755.

In block B755, the control device 200 sets the operating status of the production-system machine to 'idle' and removes the workpiece identifier of the unloaded workpiece. And the control device 200 updates the state of the unloaded workpiece by changing the last-performed operation to the operation that was performed by the production-system machine (unless the production-system machine is a buffer, in which case the last-performed operation is unchanged) and changing the operating status of the unloaded workpiece to 'idle.' Also, the control device 200 updates the state of transfer robot $R_r$ by adding the workpiece identifier of the unloaded workpiece to the arm of transfer robot $R_r$ that holds the unloaded workpiece.

Additionally, if transfer robot $R_r$ is unloading a source FOUP (e.g., transfer robot $R_r$ is an EFEM), then the control device 200 generates and initializes the state of the unloaded workpiece if the state has not already been generated an initialized.

The flow then moves to block B757.

In block B757, the control device 200 sets the operating status of the production-system machine to 'operating on workpiece,' adds the workpiece identifier of the loaded workpiece to the state of the production-system machine, and updates the state of the loaded workpiece by changing the operating status to 'currently operated on.' Also, the control device 200 updates the state of transfer robot $R_r$ by removing the workpiece identifier of the loaded workpiece from the arm of transfer robot $R_r$ that held the loaded workpiece. And, if transfer robot $R_r$ is loading the workpiece into a sink FOUP (e.g., transfer robot $R_r$ is an EFEM), then the control device 200 may change the operating status of the workpiece to 'complete.'

Furthermore, when performing a swap, the loading and unloading arms of a transfer robot must be different.

The flow then proceeds to block B740.

In block B740, the control device 200 resets the timer of transfer robot $R_r$. Also, the control device resets the timer value (changes the timer value to zero) of any production-system machine that was loaded (and, in some embodiments, unloaded) by transfer robot $R_r$. The flow then moves to block B760.

In block B760, the control device 200 determines whether there is another transfer task in the transfer chain of the current transfer job of transfer robot $R_r$. If there is not another transfer task in the transfer chain of the current transfer job of transfer robot $R_r$ (B760=No), and thus transfer robot $R_r$ has completed the last transfer task in the transfer chain of the current transfer job, then the flow advances to block B761. In block B761, the control device 200 unblocks all of the production-system machines that were visited in the just-completed transfer chain of the transfer job. Also, in block B740, the control device 200 may determine whether any production-system machine that was just loaded or unloaded in one or more of blocks B737, B747, B755, and B757 is visited again in the transfer chain of the current transfer job and unblock any production-system machine that is not visited again in the current transfer job.

Then, in block B762, the control device 200 sets the operating status of transfer robot $R_r$ to 'idle.' The flow the proceeds to block B767.

If there is another transfer task in the transfer chain of the current transfer job of transfer robot $R_r$ (B760=Yes), then the flow proceeds to block B765.

In block B765, where the control device 200 sets the operating status of transfer robot $R_r$ to according to the next transfer task in the transfer chain of the current transfer job. For example, if the next transfer task requires transfer robot $R_r$ to move to another machine, then the control device 200 sets the operating status of transfer robot $R_r$ to 'moving.' Of if the next transfer task requires transfer robot $R_r$ to unload a workpiece to a FOUP to which transfer robot $R_r$ just unloaded another workpiece (and thus does not need to move to unload the workpiece), then the control device 200 sets the operating status of transfer robot $R_r$ to 'unloading.' And the flow then moves to block B767.

In block B767, the control device 200 determines whether the respective state of every transfer robot has been updated (e.g., whether r=TR, where TR is the total number of transfer robots). If the respective state of every transfer robot has not been updated (B767=No), then the flow moves to block B770, where the control device 200 increases the robot index r by one (r=r+1), and the flow returns to block B705. If the respective state of every transfer robot has been updated (B767=Yes), then the flow ends in block B772.

Figure 8:
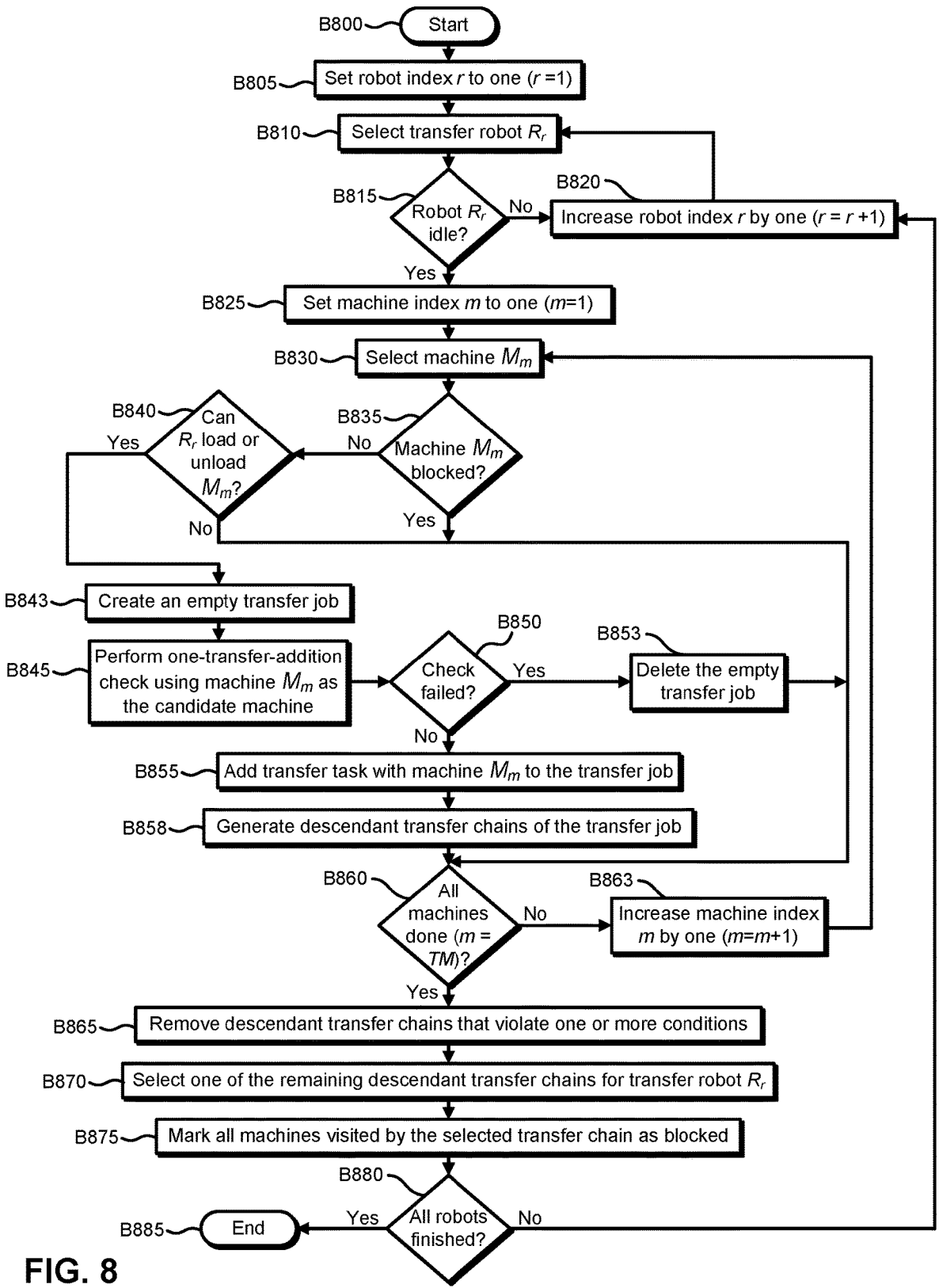
FIG. 8 illustrates an example embodiment of an operational flow for determining transfer-robot allocations.

FIG. 8 illustrates an example embodiment of an operational flow for determining transfer-robot allocations. In some embodiments, the transfer-robot allocation generates all the valid transfer jobs a transfer robot can execute given the current production-system state and then selects the transfer job that minimizes robot and machine downtimes. A valid transfer job is one where all machines in the transfer job perform the operations specified by the process description on the workpieces in the correct sequence, each machine is available by the time a robot transfers a workpiece to it, robots are available to unload workpieces from and load workpieces on machines when the machines have finished processing workpieces, and the arms of the robots are capable of holding the workpieces that the robot unloads and loads.

The flow starts in block B800 and moves to block B805, where a control device sets a transfer-robot index (robot index) r to 1. Next, in block B810, the control device 200 selects transfer robot $R_r$. The flow then moves to block B815, where the control device 200 determines whether the operating status of transfer robot $R_r$ is 'idle.' If the operating status of transfer robot $R_r$ is not 'idle' (B815=No), then the flow moves to block B820, where the control device 200 increases the robot index r by one (r=r+1), and the flow returns to block B810. Thus, in some embodiments, in every time step, if a transfer robot is actively executing a transfer job, then no other transfer jobs are allocated to the transfer robot. This makes the scheduling non-preemptive because a transfer job must be executed until completion before a new transfer job is allocated and executed regardless of job priorities.

If the operating status of transfer robot $R_r$ is 'idle' (B815=Yes), then the flow advances to block B825.

In block B825, the control device 200 sets a production-system-machine index m to 1.

The flow then moves to block B830, where the control device 200 selects production-system machine $M_m$. Next, in block B835, the control device 200 determines whether machine $M_m$ is blocked based on the state of machine $M_m$. A blocked production-system machine is a production-system machine that has been marked as blocked by a previous robot allocation at the same time step (see block B880). Initially, all production-system machines are unblocked. If machine $M_m$ is blocked (B835=Yes), then the flow proceeds to block B860. If machine $M_m$ is not blocked (B835=No), then the flow moves to block B840.

In block B840, the control device 200 determines whether transfer robot $R_r$ can either load or unload machine $M_m$. If the control device 200 determines that transfer robot $R_r$ both cannot load machine $M_m$ and cannot unload machine $M_m$ (B840=No), then the flow proceeds to block B860. If the control device 200 determines that transfer robot $R_r$ can either load or unload machine $M_m$ (B840=Yes), then the flow moves to block B843.

In block B843, the control device 200 creates an empty transfer job. As noted above, a transfer job is composed of a chain (sequence) of transfer tasks to or from production-system machines.

FIGS. 9A-C illustrate example embodiments of transfer tasks. The transfer task in FIG. 9A indicates the following: transfer robot $R_n$ performs a transfer with machine $M_x$; the transfer is a swap; arm $A_1$ of transfer robot $R_n$ unloads workpiece $W_y$ from machine $M_x$; and arm $A_2$ of transfer robot $R_n$ loads workpiece $W_z$ into machine $M_x$.

The transfer task in FIG. 9B indicates the following: transfer robot $R_n$ performs a transfer with machine $M_x$; the transfer is a unload; and arm $A_1$ of transfer robot $R_n$ unloads workpiece $W_y$ from machine $M_x$.

The transfer task in FIG. 9C indicates the following: transfer robot $R_n$ performs a transfer with machine $M_x$; the transfer is a load; and arm $A_1$ of transfer robot $R_n$ loads workpiece $W_y$ into machine $M_x$.

The transfer job that is created in block B843 is empty, and consequently does not include any transfer tasks.

Next, in block B845 the control device 200 performs a one-transfer-addition check using machine $M_m$ as the candidate machine and using the empty transfer job. The one-transfer-addition check determines whether the addition of a single transfer task to the chain of transfers in a transfer job is valid. Given a transfer robot; a transfer chain of n transfer tasks $C=\{T_1, T_2, \ldots, T_n\}$ in a transfer job (in which all production-system constraints and robot delays are respected), where n can be zero or more; and a potential new transfer task $T_{potential}$, the one-transfer-addition check determines whether the transfer chain $C'=CT=\{T_1, T_2, \ldots, T_n, T_{potential}\}$ is a valid transfer chain and identifies the new transfer task's type (load, unload, swap) and the arm(s) that will be used in the new transfer task $T_{potential}$. An example embodiment of an operational flow for performing a one-transfer-addition check is described in FIG. 10.

In block B845, because there is not a preceding transfer (n is zero), the one-transfer-addition check determines whether the candidate machine (machine $M_m$) can be the first transfer task in a transfer job.

Next, in block B850, the control device determines whether the one-transfer-addition check in block B845 failed. If the one-transfer-addition check in block B845 failed (B850=Yes), then the flow proceeds to block B853. In block B853, the control device 200 deletes the empty transfer job, and then the flow advances to block B860.

If the one-transfer-addition check in block B845 did not fail (B850=No), then the flow proceeds to block B855 in some embodiments. In block B855, the control device 200 adds a transfer task with machine $M_m$ to the transfer job (a transfer task with machine $M_m$ can refer to a transfer to machine $M_m$, a transfer from machine $M_m$, or both a transfer to and a transfer from machine $M_m$ (a swap with machine $M_m$)).

However, in some embodiments, the one-transfer-addition check adds a transfer task with machine $M_m$ to the transfer job if the check does not fail. Thus, the control device 200 can determine whether the check failed in block B850 by determining whether the one-transfer-addition check added the transfer task to the transfer job. These embodiments omit block B855, and the flow moves from block B850 to block B858 if the one-transfer-addition check succeeds.

Figure 12:
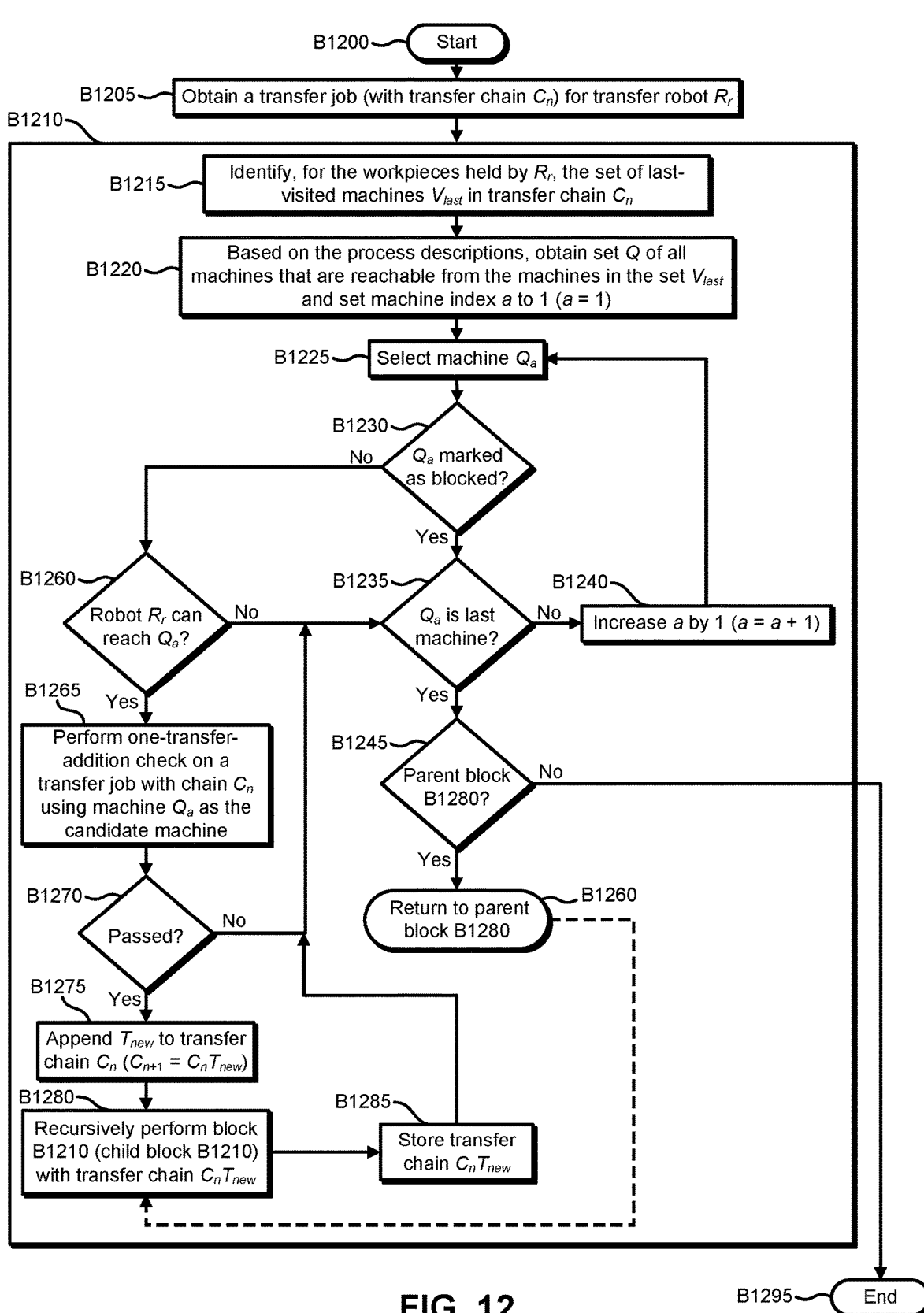
FIG. 12 illustrates an example embodiment of an operational flow for generating descendant transfer chains.

In block B858, the control device 200 generates descendant transfer chains of the transfer job, for example as described in FIG. 12. Each descendant transfer chain of a transfer job is a transfer chain that could be appended to the last transfer task in the transfer job. For example, the control device 200 may recursively generate descendant transfer chains of the transfer job. And the control device 200 may generate every possible descendent transfer chain of the transfer job. Thus the descendant transfer chains of the transfer job may encompass every possible transfer chain that could be appended to the end of the transfer job. Because the transfer job in block B855 includes only the transfer task with machine $M_m$, the descendant transfer chains that are generated in block B858 indicate the transfer chains that could be generated if the transfer task with machine $M_m$ is the first transfer task.

For example, FIG. 9D illustrates an example embodiment of the descendant transfer chains of a transfer job. FIG. 9D represents the descendant transfer chains of a transfer job that includes one transfer task, $T_{1,1}$, in the form of a transfer tree 300, where each node is a transfer task. In the transfer tree, each path from the root transfer ($T_{1,1}$) to a leaf transfer is a transfer chain, which constitutes a transfer job. For example, one transfer chain includes the following transfers tasks: $T_{1,1}$; $T_{2,1}$; $T_{3,2}$; $T_{4,3}$; and $T_{5,4}$. And another transfer chain includes the following transfer tasks: $T_{1,1}$; $T_{2,2}$; $T_{3,5}$; $T_{4,5}$; $T_{5,6}$; and $T_{6,2}$. Each descendent transfer chain may be referred to as a candidate transfer chain. Also, each transfer task in the transfer tree that is followed by one or more transfer tasks may be referred to as a parent transfer task, and each transfer task in the transfer tree that follows a transfer task may be referred to as a child transfer task. A transfer task may be both a parent transfer task and a child transfer task. For example, $T_{1,1}$ is a parent transfer task but not a child transfer task, $T_{3,3}$ is both a parent transfer task and a child transfer task, and $T_{6,1}$ is a child transfer task but not a parent transfer task.

Then, in block B860, the control device 200 determines whether all production-system machines have already been selected in block B830 (e.g., whether m=TM, where TM is the total number of production-system machines). If all production-system machines have already been selected in block B830 (B860=Yes), then the flow advances to block B865. If all production-system machines have not already been selected in block B830 (B860=No), then the flow moves to block B863. In block B863, the control device 200 increases the machine index m by 1 (m=m+1), and the flow then returns to block B830.

When the flow reaches block B865, the control device 200 may have generated a plurality of descendant transfer chains for transfer robot $R_r$, which may include one or more transfer trees, each of which may include a plurality of descendant transfer chains. In block B865, the control device 200 deletes any descendant transfer chains that violate one or more conditions (e.g., constraints). Examples of conditions include the following three conditions: (1) A transfer robot must start and end a transfer job with all arms free of workpieces. (2) A transfer robot cannot reach a state of having all of its arms free of workpieces before the end of the transfer job. According to condition (2), the transfer robot cannot transfer workpieces among production-system machines until there are no more workpieces carried by the transfer robot and then proceed to other production-system machines and perform more transfer tasks. Without this condition, there may be no difference between performing one long transfer job versus multiple short transfer jobs, and performing multiple short transfer jobs may increase throughput because it gives the control device 200 another chance to better allocate the transfer robot given a future production-system state that is not accessible during the current robot allocation. (3) Every workpiece unloaded from a production-system machine during a transfer job must immediately move to a production-system machine that would perform the next operation on the workpiece. By the time the workpiece reaches the next productions system machine, that machine should be available to receive the workpiece, if not the transfer robot will have unnecessary downtime. A transfer robot that moves between machines while carrying a workpiece may cause unnecessary downtime for the workpiece and occupy a transfer-robot arm that could be immediately freed and used for more transfer tasks.

The flow then moves to block B870, where the control device 200 selects one of the remaining descendant transfer chains for the transfer job for transfer robot $R_r$ based on one or more criteria. For example, the criteria may include the lengths of the transfer chains (a longer transfer chain may be preferred) or the sums of the unload (unmount) priorities of the transfer chains. An unload priority of a transfer task indicates how critical the fast removal of a workpiece from a production-system machine is, and higher numbers indicate that a fast removal is more critical. Also, a process description may include the unload priorities. And a transfer-job priority may be the sum of the unload priorities of every unload and swap transfer task in the transfer chain of the transfer job. In the case of a tie for the largest sum of unload priorities, the control device 200 may select the longest transfer chain. Also, if the unload priorities are all equal, then the control device 200 may select the longest transfer chain.

Furthermore, the criteria may also include the minimization of a standard deviation of a dwell time between depositing formable material on each workpiece (in the JM 114) and planarizing the formable material (in a PM 115) or minimizing the duration of the transfer chain (which is the time required to execute all of the tasks in the transfer chain).

The flow then moves to block B875, where the control device 200 marks all the production-system machines that are visited by the selected transfer chain (which includes machine $M_m$ and the machines in the selected descendant transfer chain) as blocked.

Next, in block B880, the control device 200 determines whether the allocation has been finished for all of the transfer robots (e.g., whether r=TR, where TR is the total number of transfer robots). If the allocation has not been finished for all of the transfer robots (B880=No), then the flow proceeds to block B820. If the allocation has been finished for all of the transfer robots (B880=Yes), then the flow ends in block B885.

FIG. 10 illustrates an example embodiment of an operational flow for performing a one-transfer-addition check. When performing the operations in FIG. 10, the control device 200 may create and use a copy of the production-system state to avoid modifying the production-system state that is being used to generate the robot allocations.

The flow starts in block B1000 and moves to block B1005, where a control device 200 obtains a transfer job (which indicates the corresponding transfer robot and includes a transfer chain) and a candidate production-system machine $M_m$ (candidate machine $M_m$).

Next, in block B1010, the control device 200 sets a robot delay time D, which is the time in the transfer chain at which the robot will reach a specified transfer task (the delay from the start of the transfer chain until the robot reaches the transfer task), to the transfer robot's motion duration $D_{tr}$, which is the time required to move between machines that is included in the transfer robot's description. This assumes that a transfer robot always starts at its home location and then moves to the first machine in transfer chain, and consequently reaches the first machine in a transfer chain after a time equal to the transfer robot's motion duration $D_{tr}$.

Then, in block B1015, the control device 200 sets the state of the transfer robot to an initial state $R_0$. For example, in some embodiments of the transfer robot's initial state $R_0$, the operating status is 'idle,' the timer value is zero, there is no transfer job, and all of the transfer robot's arms are empty.

The flow then moves to block B1020, where the control device 200 determines whether the transfer job that was obtained in block B1005 is empty. If the transfer job that was obtained in block B1005 is empty (B1020=Yes), then the flow moves directly to block B1040. If the transfer job that was obtained in block B1005 is not empty (B1020=No), then the flow proceeds to block B1025.

In block B1025, the control device 200 iterates through the transfer chain in the transfer job, performs a one-transfer-state update for each transfer task (e.g., as described in FIG. 11), and updates the state of the transfer robot. In block B1025, the purpose of performing the one-transfer-state update for every transfer task in the transfer chain may not be checking the validities of the transfer tasks—the validities of the transfer tasks were checked before they were added to the transfer chain. However, performing the one-transfer-state update for every transfer task in the transfer chain constructs the state of the transfer robot $R_r$ at the end of the transfer chain (and allows the delay time D to be determined in block B1030-B1035).

Next, in block B1030, the control device 200 increments (increases) the delay time D according to the visit type (load, unload, swap) of each transfer task in the transfer chain, as indicated by the transfer robot's description. And in block B1035, the control device 200 increments the delay time D by the transfer robot's motion duration $D_{tr}$ for each transfer task in the transfer chain. Accordingly, after block B1035, the delay time D includes the total time that the transfer robot will spend performing transfer tasks at the machines and moving between the machines while executing the transfer tasks in the transfer job. The flow then moves to block B1040.

Figure 11:
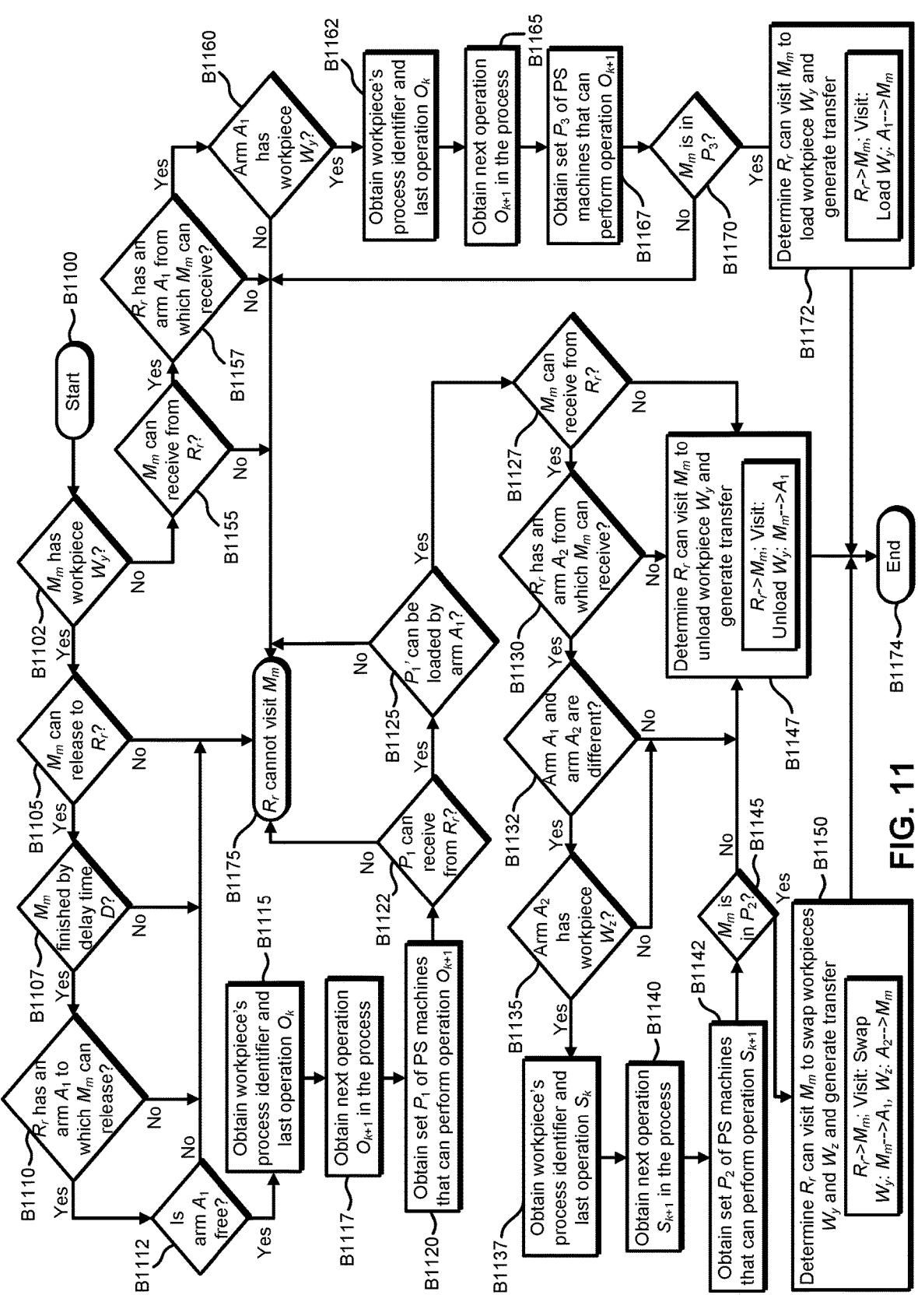
FIG. 11 illustrates an example embodiment of an operational flow for performing a one-transfer-state update.

In block B1040, the control device 200 performs a one-transfer-state update for the candidate machine $M_m$ based on the production-system state and the delay time D (e.g., as described in FIG. 11). When the flow reaches block B1040, the production-system state (the copy of the production-system state that is used in the one-transfer-addition check) indicates the identifiers of all workpieces carried by all of the transfer-robot's arms, the identifiers of the workpieces that are held by the candidate machine $M_m$, and the identifiers of the last operation that was performed on each workpiece, as well as other information (e.g., the timer value of the candidate machine $M_m$).

Next, in block B1045, the control device 200 determines whether the one-transfer-state update for the candidate machine $M_m$ passed. For example, the control device 200 may determine that the one-transfer-state update for the candidate machine $M_m$ passed if the one-transfer-state update generates a transfer task and may determine that the one-transfer-state update for the candidate machine $M_m$ did not pass if the one-transfer-state update does not generate a transfer task. If the one-transfer-state update for the candidate machine $M_m$ passed (B1045=Yes), then the flow moves to block B1050, where the control device 200 adds a transfer task with the candidate machine $M_m$ (e.g., a transfer that was generated by the one-transfer-state update) to the transfer job by appending the transfer task to the end of the transfer chain. The flow then ends in block B1060.

If the one-transfer-state update for the candidate machine $M_m$ did not pass (B1045=No), then the flow moves to block B1055, where the control device 200 does not add a transfer task with the candidate machine $M_m$ to the transfer job. The flow then ends in block B1060. And block B1055 may be omitted.

FIG. 11 illustrates an example embodiment of an operational flow for performing a one-transfer-state update. The flow starts in block B1100. When the flow begins, a control device 200 obtains or has already obtained a candidate machine $M_m$, a state of the candidate machine $M_m$, a transfer robot $R_r$, a state of the transfer robot $R_r$, a delay time D of the transfer robot $R_r$, and the identifiers and states of any workpieces that are held by the candidate machine $M_m$ and the transfer robot $R_r$.

Next, in block B1102, the control device 200 determines whether the candidate machine $M_m$ currently holds a workpiece (identified as workpiece $W_y$). If the candidate machine $M_m$ does currently hold a workpiece (B1102=Yes), then the flow moves to block B1105. If the candidate machine $M_m$ does not currently hold a workpiece (B1102=No), then the flow moves to block B1155.

In block B1105, the control device 200 determines whether the candidate machine $M_m$ can release a workpiece to the transfer robot $R_r$ based on the production-system description. If the candidate machine $M_m$ cannot release a workpiece to the transfer robot $R_r$ (B1105=No), then the flow moves to block B1175.

In block B1175, the control device 200 determines that the transfer robot $R_r$ cannot visit the candidate machine $M_m$ and the flow ends.

If the candidate machine $M_m$ can release a workpiece to the transfer robot $R_r$ (B1105=Yes), then the flow proceeds to block B1107. In block B1107, the control device 200 determines whether the candidate machine $M_m$ will finish processing workpiece $W_y$ by the delay time D of the transfer robot $R_r$. If the candidate machine $M_m$ will not finish processing workpiece $W_y$ by the delay time D of the transfer robot $R_r$ (B1107=No), then the flow moves to block B1175. If the candidate machine $M_m$ will finish processing workpiece $W_y$ by the delay time D of the transfer robot $R_r$ (B1107=Yes), then the flow advances to block B1110.

In block B1110, the control device 200 determines whether the transfer robot $R_r$ has an arm $A_1$ to which the candidate machine $M_m$ can release a workpiece. If the transfer robot $R_r$ does not have an arm $A_1$ to which the candidate machine $M_m$ can release a workpiece (B1110=No), then the flow proceeds to block B1175. If the transfer robot $R_r$ does have an arm $A_1$ to which the candidate machine $M_m$ can release a workpiece (B1110=Yes), then the flow advances to block B1112.

In block B1112, the control device 200 determines whether arm $A_1$ is free (i.e., is not currently holding a workpiece). If arm $A_1$ is not free (B1112=No), then the flow proceeds to block B1175. If arm $A_1$ is free (B1112=Yes), then the flow moves to block B1115.

In block B1115, the control device 200 obtains the process identifier of the process that is being performed on workpiece $W_y$ and the last-performed operation $O_k$ of workpiece $W_y$. Next, in block B1117, the control device 200 obtains the next operation $O_{k+1}$ in the process that is being performed on workpiece $W_y$. Note that the next operation $O_{k+1}$ in the process may be a sink operation.

Then, in block B1120, the control device 200 obtains the set $P_1$ of all the production-system (PS) machines that can perform the next operation $O_{k+1}$.

The flow then moves to block B1122, where the control device 200 determines whether any of the machines in set $P_1$ can receive a workpiece from the transfer robot $R_r$. If none of the machines in set $P_1$ can receive a workpiece from the transfer robot $R_r$ (B1122=No), then the flow moves to block B1175. If one or more of the machines in set P can receive a workpiece from the transfer robot $R_r$ (B1122=Yes), then the flow advances to block B1125. And the machines in set $P_1$ that can receive a workpiece from the transfer robot $R_r$ are identified as set $P_1'$.

In block B1125, the control device 200 determines whether any of the machines in set $P_1'$, which can receive a workpiece from the transfer robot $R_r$, can be loaded by arm $A_1$. If none of the machines in set $P_1'$ can be loaded by arm $A_1$ (B1125=No), then the flow moves to block B1175. If at least one of the machines in set $P_1'$ can be loaded by arm $A_1$ (B1125=Yes), then the flow moves to block B1127.

In block B1127, the control device 200 determines whether the candidate machine $M_m$ can receive a workpiece from the transfer robot $R_r$. If the candidate machine $M_m$ cannot receive a workpiece from the transfer robot $R_r$ (B1127=No), then the flow proceeds to block B1147.

In block B1147, the control device 200 determines that the transfer robot $R_r$ can visit the candidate machine $M_m$ to unload workpiece $W_y$. Also, the control device 200 generates a transfer task that indicates that transfer robot $R_r$ visits the candidate machine $M_m$, that the visit is an unload task, and that workpiece $W_y$ is unloaded to arm $A_1$ during the visit. The flow then ends in block B1174 (and the generated transfer may be returned to a calling operation).

If the candidate machine $M_m$ can receive a workpiece from the transfer robot $R_r$ (B1127=Yes), then the flow advances to block B1130.

In block B1130, the control device 200 determines whether the transfer robot $R_r$ has an arm $A_2$ from which the candidate machine $M_m$ can receive a workpiece. If the transfer robot $R_r$ does not have an arm $A_2$ from which the candidate machine $M_m$ can receive a workpiece (B1130=No), then the flow proceeds to block B1147. If the transfer robot $R_r$ does have an arm $A_2$ from which the candidate machine $M_m$ can receive a workpiece (B1130=Yes), then the flow proceeds to block B1132.

In block B1132, the control device 200 determines whether arm $A_1$ and arm $A_2$ are different arms. If arm $A_1$ and arm $A_2$ are not different arms (B1132=No), then the flow moves to block B1147. If arm $A_1$ and arm $A_2$ are different arms (B1132=Yes), then the flow proceeds to block B1135.

In block B1135, the control device 200 determines whether arm $A_2$ is holding a workpiece (identified as workpiece $W_z$). If arm $A_2$ is not holding a workpiece (B1135=No), then the flow advances to block B1147. If arm $A_2$ is holding a workpiece (B1135=Yes), then the flow moves to block B1137.

In block B1137, the control device 200 obtains the process identifier of the process that is being performed on workpiece $W_z$ and the last-performed operation $S_k$ of workpiece $W_z$. Then, in block B1140, the control device 200 obtains the next operation $S_{k+1}$ in the process that is being performed on workpiece $W_z$. And, in block B1142, the control device 200 obtains the set $P_2$ of all the production-system machines that can perform the next operation $S_{k+1}$. The flow then moves to block B1145.

In block B1145, the control device 200 determines whether the candidate machine $M_m$ is in the set $P_2$ of all the production-system machines that can perform the next operation $S_{k+1}$. If the candidate machine $M_m$ is not in the set $P_2$ of all the production-system machines that can perform the next operation $S_{k+1}$ (B1145=No), then the flow proceeds to block B1147. If the candidate machine $M_m$ is in the set $P_2$ of all the production-system machines that can perform the next operation $S_{k+1}$ (B1145=Yes), then the flow moves to block B1150.

In block B1150, the control device 200 determines that the transfer robot $R_r$ can visit the candidate machine $M_m$ to swap workpiece $W_y$ and workpiece $W_z$. Also, the control devices generates a transfer task that indicates that transfer robot $R_r$ visits the candidate machine $M_m$, that the visit is a swap task, that workpiece $W_y$ is unloaded to arm $A_1$ during the visit, and that workpiece $W_z$ is loaded from arm $A_2$ during the visit. The flow then ends in block B1174 (and the generated transfer task may be returned to a calling operation).

As noted above in the description of block B1102, if the candidate machine $M_m$ does not currently hold a workpiece (B1102=No), then the flow moves to block B1155.

In block B1155, the control device 200 determines whether the candidate machine $M_m$ can receive a workpiece from the transfer robot $R_r$. If the candidate machine $M_m$ cannot receive a workpiece from the transfer robot $R_r$ (B1155=No), then the flow proceeds to block B1175. If the candidate machine $M_m$ can receive a workpiece from the transfer robot $R_r$ (B1155=Yes), then the flow moves to block B1157.

In block B1157, the control device 200 determines whether the transfer robot $R_r$ has an arm $A_1$ from which the candidate machine $M_m$ can receive a workpiece. If the transfer robot $R_r$ does not have an arm $A_1$ from which the candidate machine $M_m$ can receive a workpiece (B1157=No), then the flow proceeds to block B1175. If the transfer robot $R_r$ does have an arm $A_1$ from which the candidate machine $M_m$ can receive a workpiece (B1157=Yes), then the flow advances to block B1160.

In block B1160, the control device 200 determines whether arm $A_1$ is holding a workpiece (identified as workpiece $W_y$). If arm $A_1$ is not holding a workpiece (B1160=No), then the flow moves to block B1175. If arm $A_1$ is holding a workpiece (B1160=Yes), then the flow proceeds to block B1162.

In block B1162, the control device 200 obtains the process identifier of the process that is being performed on workpiece $W_y$ and the last-performed operation $O_k$ of workpiece $W_y$. Next, in block B1165, the control device 200 obtains the next operation $O_{k+1}$ in the process that is being performed on workpiece $W_y$. Then, in block B1167, the control device 200 obtains the set $P_3$ of all the production-system (PS) machines that can perform the next operation $O_{k+1}$.

The flow then moves to block B1170, where the control device 200 determines whether the candidate machine $M_m$ is in the set $P_3$ of all the production-system machines that can perform the next operation $O_{k+1}$. If the candidate machine $M_m$ is not in the set $P_3$ of all the production-system machines that can perform the next operation $O_{k+1}$ (B1170=No), then the flow proceeds to block B1175. If the candidate machine $M_m$ is in the set $P_3$ of all the production-system machines that can perform the next operation $O_{k+1}$ (B1170=Yes), then the flow moves to block B1172.

In block B1172, the control device 200 determines that the transfer robot $R_r$ can visit the candidate machine $M_m$ to load workpiece $W_y$. Also, the control device 200 generates a transfer task that indicates that the transfer robot $R_r$ visits the candidate machine $M_m$, that the visit is a load task, and that workpiece $W_y$ is loaded from arm $A_1$ during the visit. The flow then ends in block B1174 (and the generated transfer task may be returned to a calling operation).

FIG. 12 illustrates an example embodiment of an operational flow for generating descendant transfer chains. The flow starts in block B1200 and moves to block B1205, where a control device 200 obtains a transfer job (that includes transfer chain $C_n$) for transfer robot $R_r$. Next, the control device performs block B1210, which includes blocks B1215-B1260.

In block B1215, the control device 200 identifies, for each workpiece that is held by the robot $R_r$, the last-visited production-system machine in transfer chain $C_n$ based on the corresponding process description of the respective process of the workpiece. These last-visited production-system machines constitute the set $V_{last}$.

Next, in block B1220, the control device 200 obtains the set Q of all production-system machines that are reachable from the machines in the set $V_{last}$ in the process descriptions. For example, in embodiments in which the process descriptions are represented in a directed graph, the control device 200 may identify the nodes (production-system machines) that follow the last-visited nodes (production-system machines that executed the last-performed operations) of the workpieces. Thus, for each workpiece that is held by the transfer robot $R_r$, the set Q includes all the production-system machines that can perform the respective operation that follows the respective last-performed operation of the workpiece. Also, the control device sets a machine index a to 1.

Then, in block B1225, the control device selects machine $Q_a$.

The flow then moves to block B1230, where the control device 200 determines whether machine $Q_a$ has been marked as blocked based on the current production-system state. If machine $Q_a$ has been marked as blocked (B1230=Yes), then the flow proceeds to block B1235. If in block B1230 machine $Q_a$ has not been marked as blocked (B1230=Yes), then the flow proceeds to block B1260.

In block B1260, the control device 200 determines whether robot $R_r$ can reach machine $Q_a$. If robot $R_r$ cannot reach machine $Q_a$ (B1260=No), then the flow moves to block B1235. If robot $R_r$ can reach machine $Q_a$ (B1260=Yes), then the flow advances to block B1265.

In block B1265, the control device 200 performs a one-transfer-addition check on a transfer job that includes transfer chain $C_n$ using machine $Q_a$ as the candidate machine (e.g., as described in FIG. 10).

Next, in block B1270, the control device 200 determines whether machine $Q_a$ passed the one-transfer-addition check. If machine $Q_a$ did not pass the one-transfer-addition check (B1270=No), then the flow proceeds to block B1235. If machine $Q_a$ did pass the one-transfer-addition check (B1270=Yes), then the flow proceeds to block B1275. In block B1275, the control device 200 appends the transfer task $T_{new}$, which is the transfer with machine $Q_a$, to the transfer chain $C_n$. This generates transfer chain $C_{n+1}$ ($C_{n+1}=C_n T_{new}$). Also, in some embodiments, block B1265 obtains transfer chain $C_{n+1}$ ($C_{n+1}=C_n T_{new}$) from the one-transfer-addition check if machine $P_a$ passes the one-transfer-addition check, and block B1275 may be omitted from these embodiments.

The flow then moves to block B1280, where the control device 200 recursively performs block B1210 (child block B1210) with transfer chain $C_n T_{new}$. Thus, in the child block B1210, transfer chain $C_n T_{new}$ is transfer chain $C_n$.

Next, in block B1285, the control device 200 stores transfer chain $C_n T_{new}$. Also, the control device 200 may add $T_{new}$ to a transfer tree (e.g., as shown in FIG. 9D) that is used to represent all of the transfer tasks that are added by any execution of block B1210 (any transfer task that is added by the first parent block B1210 and any child block B1210). The flow then moves to block B1235.

In block B1235, the control device 200 determines whether machine $Q_a$ is the last machine in the set Q (whether all the machines in Q have been selected). If machine $Q_a$ is not the last machine in the set Q (B1235=No), then the flow proceeds to block B1240, where machine index a is increased by 1 (a=a+1), and the flow then returns to block B1225. If machine $Q_a$ is the last machine in the set Q (B1235=Yes), then the flow moves to block B1245.

In block B1245, the control device 200 determines whether the currently executed block B1210 has a parent block B1280, which is a block B1280 that is executing the currently executed block B1210. If the currently executed block B1210 has a parent block B1280 (B1245=Yes), then the flow proceeds to block B1260. In block B1260, the control device 200 ends the currently executed block B1210 and returns the flow to the parent block B1280. Also, in some embodiments, any transfer chain that was stored by the currently executed block B1210 (in block B1285) is returned to the parent block B1280, or an indication of success (a transfer task was added) or failure (no transfer task was added) is returned to the parent block B1280.

If the currently executed block B1210 does not have a parent block (B1245=No), then the flow ends in block B1295.

Thus, the operational flow starts with a transfer chain of length n (n transfer tasks) and from that transfer chain ($C_n$) generates the set $S_{n+1}$ of all the valid transfer chains of length n+1. From the transfer chains in the set $S_{n+1}$, the set $S_{n+2}$ of all valid transfer chains of length n+2 is generated. The operational flow runs recursively and generates sets of longer chains ($S_{n+1}$, $S_{n+2}$, $S_{n+3}$, $S_{n+4}$, . . . ) until all possible valid transfer chains are generated. At the end, all of the generated transfer chains constitute a set of all valid transfer tasks S. To generate a transfer chain $C_{n+1}$, which has n+1 transfer tasks, from a transfer chain $C_n$, which has n transfer tasks, the operational flow looks ahead to predict the state of the transfer robot $R_r$ upon the addition of the extra transfer task and checks that the addition is valid. And the recursions build child transfer chains from parent transfer chains. The recursive nature of the operational flow terminates when there are no more valid transfer chains that can be generated. Also, in FIG. 12, the operational flow stores the valid transfer chains of any length (the generation of a child transfer chain does not overwrite a parent chain). However, some embodiments of FIG. 12 discard any transfer chain that is a parent transfer chain (which is a transfer chain that has a child transfer chain).

Figure 13:
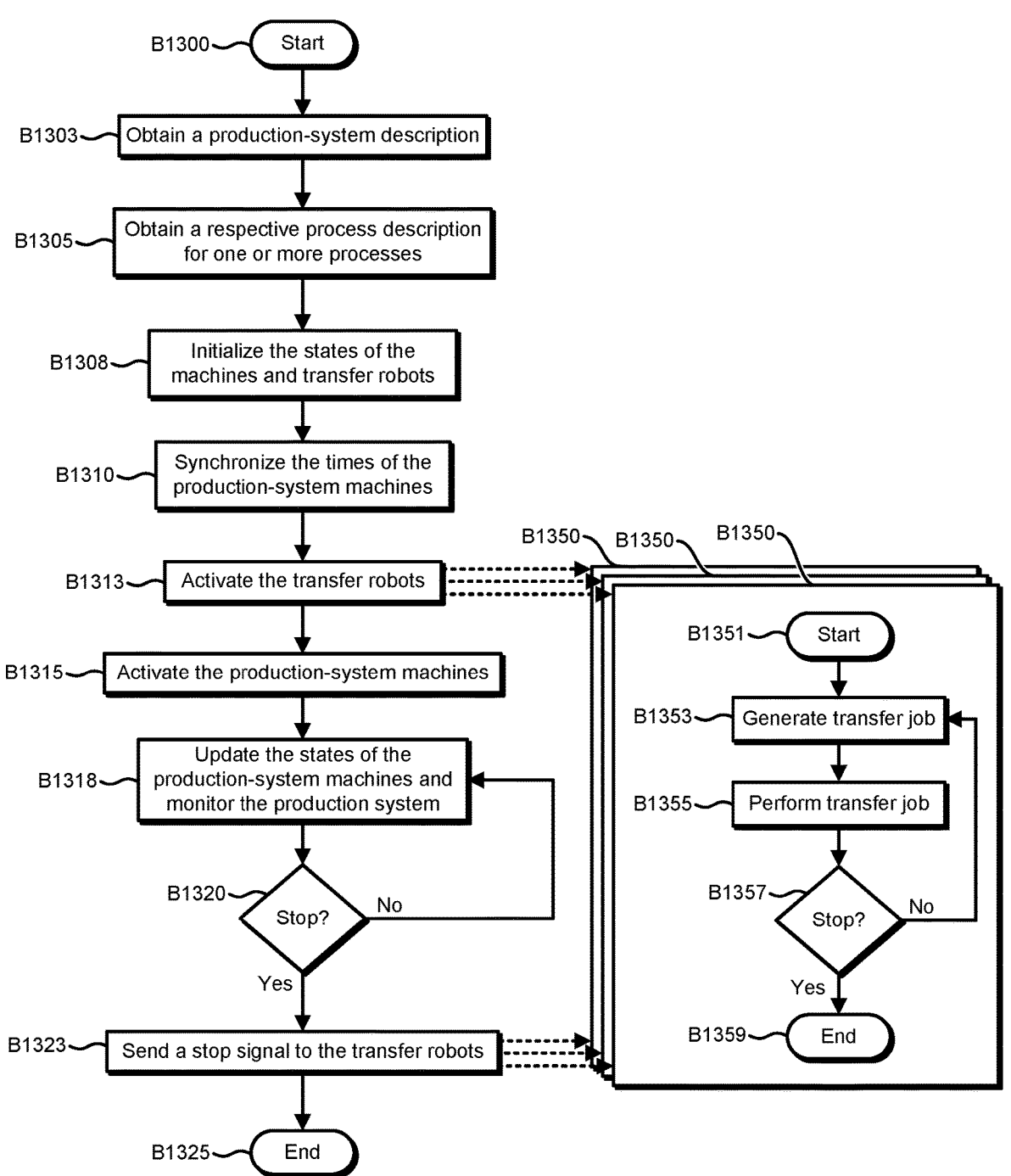
FIG. 13 illustrates an example embodiment of an operational flow for processing workpieces in which each transfer robot generates its own transfer jobs.

FIG. 13 illustrates an example embodiment of an operational flow for processing workpieces in which each transfer robot generates its own transfer jobs. The flow starts in block B1300 and moves to B1303, where a control device 200 obtains a production-system description (e.g., from storage, from a server, from user entry).

Next, in block B1305, the control device 200 obtains a respective process description for one or more processes. FIG. 3C illustrates the information that is included in an example embodiment of a process description. The information includes an identifier, identifiers of the operations that are performed by the process, a sequence of the operations that are performed by the process, a source name, and a sink name.

Also, a process description may be represented in the form of a flow graph (e.g., a directed acyclic graph). And, in block B1305, the control device 200 may obtain process descriptions in the form of a flow graph or generate a flow graph based on the process descriptions. The flow then proceeds to block B1308, where the control device 200 initializes the respective states of the production-system machines and the transfer robots.

The flow then advances to block B1310, where the control device 200 synchronizes the times of all of the production-system machines and transfer robots.

Next, in block B1313, the control device 200 activates the transfer robots. Each transfer robot then begins to perform a respective instance of block B1350. Thus, if there are eight transfer robots, eight instances of block B1350 are performed. The transfer robots perform block B1350 while the control device 200 performs blocks B1315-B1320.

The flow then moves to block B1315, where the control device 200 activates the production-system machines. And, in block B1318, the control device 200 updates the states of the production-system machines and monitors the production system (e.g., for errors). For the example, the control device 200 may add new FOUPs, which include new workpieces, as sources and initialize the respective states of the new workpieces, and the control device 200 may delete the states of completed workpieces that have been received by the sink. In some embodiments, the control device 200 is the only device that can directly modify the states of the production-system machines, the transfer robots, and the workpieces, and the transfer robots cannot directly modify any of the states. Thus, to update any of the states, the transfer robots communicate with the control device 200, and, in block B1318, the control device 200 modifies the states in accordance with the messages that the control device 200 receives from the transfer robots.

The flow then moves to block B1320, where the control device 200 determines whether to stop processing workpieces (e.g., in response to a stop instruction, after a set amount of time has passed, after a set number of workpieces have been processed).

If the control device 200 determines not to stop processing workpieces (B1320=No), then the flow returns to block B1318. If the control device 200 determines to stop processing workpieces (B1320=Yes), then the flow advances to block B1323, where the control device 200 sends a stop signal to the transfer robots, which causes them to end their instances of block B1350 (in block B1357). The flow then ends in block B1325.

Each instance of block B1350 is performed by a transfer robot and includes blocks B1351-B1359. In block B1351, the transfer robot begins operating. Next, in block B1353, the transfer robot generates a transfer job, for example as described in FIG. 14. The transfer robot performs block B1353 until a transfer job is successfully generated, and the flow then moves to block B1355, where the transfer robot performs the transfer job, for example as described in FIG. 15.

Next, in block B1357, the transfer robot determines whether to stop generating and performing transfer jobs. In this embodiment, the transfer robot determines whether a stop signal has been received from the control device 200. If the transfer robot does not determine to stop generating and performing transfer jobs (B1357=No), then the flow returns to block B1353. If the transfer robot determines to stop generating and performing transfer jobs (B1357=Yes), then the flow ends in block B1359. Also, the transfer robot may determine to stop while performing block B1353 or block B1355.

Furthermore, in some embodiments, devices other than the transfer robots perform block B1350. For example, the instances block B1350 may be performed by a control device 200 or by multiple control devices 200.

Figure 14:
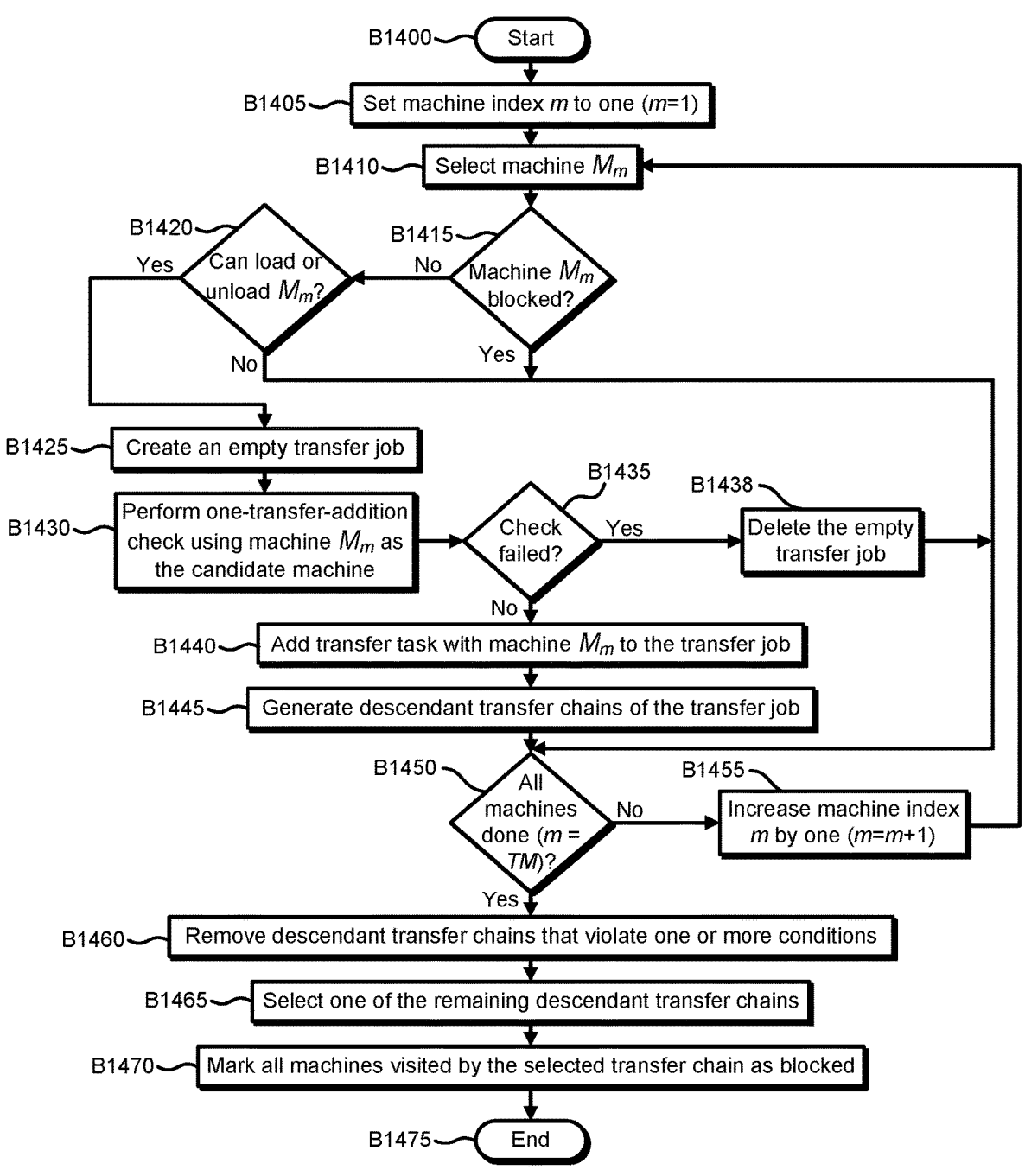
FIG. 14 illustrates an example embodiment of an operational flow for generating a transfer job.

FIG. 14 illustrates an example embodiment of an operational flow for generating a transfer job. The flow starts in block B1400 and moves to block B1405, where a transfer robot 120 sets a production-system machine index m to 1.

The flow then moves to block B1410, where the transfer robot 120 selects production-system machine $M_m$. Next, in block B1415, the transfer robot 120 determines whether machine $M_m$ is blocked based on the state of machine $M_m$. If machine $M_m$ is blocked (B1415=Yes), then the flow proceeds to block B1450. If machine $M_m$ is not blocked (B1415=No), then the flow moves to block B1420.

In block B1420, the transfer robot 120 determines whether it can load or unload machine $M_m$. If the transfer robot 120 cannot load or unload machine $M_m$ (B1420=No), then the flow proceeds to block B1450. If the transfer robot 120 can load or unload machine $M_m$ (B1420=Yes), then the flow moves to block B1425. Also, in some embodiments, the transfer robot 120 uses a list that includes only machines that can be loaded or unloaded by the transfer robot. Thus, block B1420 is omitted from some embodiments.

In block B1425, the transfer robot 120 creates an empty transfer job. Next, in block B1430, the transfer robot 120 performs a one-transfer-addition check (e.g., as described in FIG. 10) using machine $M_m$ as the candidate machine and using the empty transfer job. In block B1430, because there is not a preceding transfer (n is zero), the one-transfer-addition check determines whether machine $M_m$ can be the first transfer task in a transfer job.

Then, in block B1435, the transfer robot 120 determines whether the one-transfer-addition check in block B1430 failed. If the one-transfer-addition check in block B1430 failed (B1435=Yes), then the flow proceeds to block B1438. In block B1438, the transfer robot 120 deletes the empty transfer job, and then the flow advances to block B1450.

If the one-transfer-addition check in block B1430 did not fail (B1435=No), then the flow proceeds to block B1440 in some embodiments. In block B1440, the transfer robot 120 adds a transfer task with machine $M_m$ to the transfer chain of the transfer job. However, in some embodiments, the one-transfer-addition check adds a transfer task with machine $M_m$ to the transfer chain of the transfer job if the check does not fail. Thus, the transfer robot 120 can determine whether the check failed by determining whether the one-transfer-addition check added the transfer task to the transfer job. These embodiments omit block B1440, and the flow moves from block B1435 to block B1445 if the one-transfer-addition check succeeds.

In block B1445, the transfer robot 120 generates descendant transfer chains of the transfer job (e.g., as described in FIG. 12).

Then, in block B1450, the transfer robot 120 determines whether all production-system machines have already been selected in block B1410 (e.g., whether m=TM, where TM is the total number of production-system machines). If all production-system machines have not already been selected in block B1410 (B1450=No), then the flow moves to block B1455. In block B1455, the transfer robot 120 increases the machine index m by 1 (m=m+1), and the flow then returns to block B1410. If all production-system machines have already been selected in block B1410 (B1450=Yes), then the flow advances to block B1460.

When the flow reaches block B1460, the transfer robot 120 may have generated a plurality of descendant transfer chains, which may be represented by one or more transfer trees. In block B1460, the transfer robot 120 deletes any descendant transfer chains (e.g., of the one or more transfer trees) that violate one or more conditions (e.g., constraints), for example as described in block B865.

The flow then moves to block B1465, where the transfer robot 120 selects one of the remaining descendant transfer chains for the transfer job based on one or more criteria, for example as described in block B870.

The flow then moves to block B1470, where the transfer robot 120 marks all the production-system machines that are visited by the selected transfer chain (which includes machine $M_m$ and the machines in the selected descendant transfer chain) as blocked.

Then the flow ends in block B1475.

Figure 15:
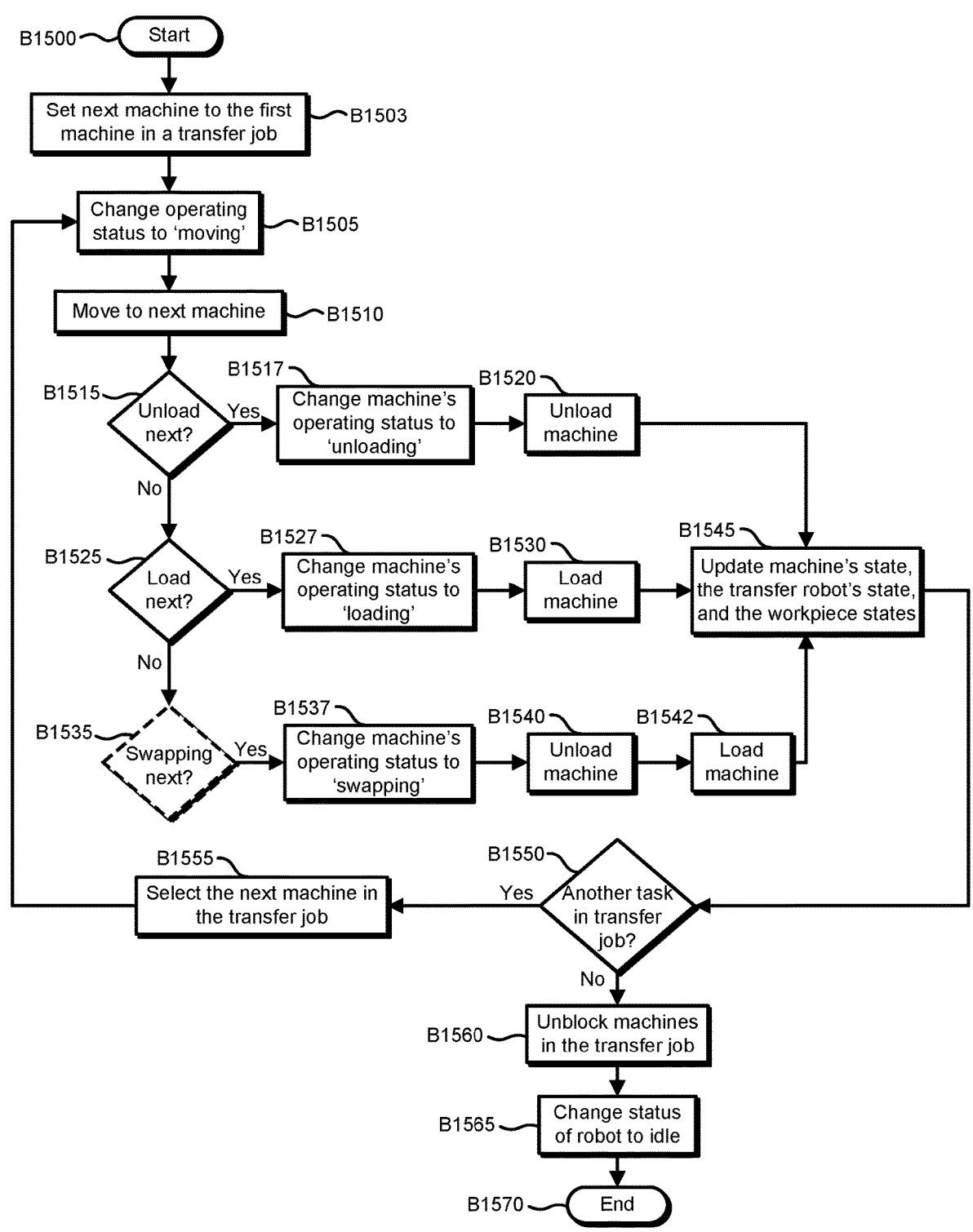
FIG. 15 illustrates an example embodiment of an operational flow for performing a transfer job.

FIG. 15 illustrates an example embodiment of an operational flow for performing a transfer job. The flow starts in block B1500 and moves to block B1503, where a transfer robot 120 sets the next machine to the first machine in a transfer chain of a transfer job.

Next, in block B1505, the transfer robot 120 changes its operating status to moving. The flow then proceeds to block B1510, where the transfer robot 120 moves to the next machine. And the flow then advances to block B1515.

In block B1515, the transfer robot 120 determines whether the next transfer task is an unload task. If the next transfer task is an unload task (B1515=Yes), then the flow advances to block B1517, where the transfer robot 120 changes its operating status to 'unloading.' The flow then moves to block B1520, where the transfer robot 120 unloads the next machine. The flow then proceeds to block B1545.

If the next transfer task is not an unload task (B1515=No), then the flow moves to block B1525.

In block B1525, the transfer robot 120 determines whether the next transfer task is a load task. If the next transfer task is a load task (B1525=Yes), then the flow proceeds to block B1527, where the transfer robot 120 changes its operating status to 'loading.' And the flow then advances to block B1530, where the transfer robot 120 performs the loading task. The flow then proceeds to block B1545.

If the next transfer task is not a load task (B1525=No), then the flow moves to block B1535.

In block B1535, the transfer robot 120 determines that the next transfer task is a swapping task, and the flow then moves to block B1537. Also, some embodiments omit block B1535, and the flow proceeds directly from block B1525 to block B1537 if the next transfer task is not a load task. In block B1537, the transfer robot 120 changes its operating status to 'swapping.' Next, in block B1540, the transfer robot 120 unloads the next machine, and then in block B1542 the transfer robot 120 loads the next machine. The flow then moves to block B1545.

In block B1545, the transfer robot 120 updates the state of the production-system machine (which may include resetting a timer of the machine), the state of the transfer robot, and the states of any workpieces that were loaded or unloaded.

For example, in block B1545, if the machine was unloaded (in block B1520 or in block B1540) then the transfer robot 120 sets the operating status of the production-system machine to 'idle' and removes the workpiece identifier of the unloaded workpiece. And the transfer robot 120 updates the state of the unloaded workpiece by changing the last-performed operation to the operation that was performed by the production-system machine (unless the machine is a buffer or a source) and changing the operating status of the unloaded workpiece to 'idle.' Also, the transfer robot 120 updates its state by adding the workpiece identifier of the unloaded workpiece to the arm that holds the unloaded workpiece.

In block B1545, if the next machine was loaded (in block B1530 or in block B1542) then the transfer robot 120 sets the operating status of the production-system machine to 'operating on workpiece,' adds the workpiece identifier of the loaded workpiece to the state of the production-system machine, and updates the state of the loaded workpiece by changing the operating status to 'currently operated on.' Also, the transfer robot 120 updates its state by removing the workpiece identifier of the loaded workpiece from the arm that held the loaded workpiece.

Also, in block B1545, the transfer robot 120 may determine whether any production-system machine that was just loaded or unloaded in one or more of blocks B1520, B1530, B1540, and B1542 is visited again in the transfer chain of the transfer job and unblock any production-system machine that is not visited again in the transfer job.

The flow then proceeds to block B1550.

In block B1550, the transfer robot 120 determines whether there is another task in the transfer chain of the transfer job. If there is another task (B1550=Yes), then the flow proceeds to block B1555, where the transfer robot 120 selects the next machine (the machine that is being visited in the next task) in the transfer job, and the flow returns to block 1505. If there is not another transfer task (B1550=No), and thus the transfer robot 120 has completed the last task in the transfer chain of the transfer job, then the flow advances to block B1560.

In block B1560, the transfer robot 120 unblocks all of the production-system machines that were in the just-completed transfer job. Block B1560 can be omitted from embodiments in which the machines are unblocked in block B1545.

Then, in block B1565, the transfer robot 120 sets its operating status to 'idle.' And the flow ends in block B1570.

Figure 16:
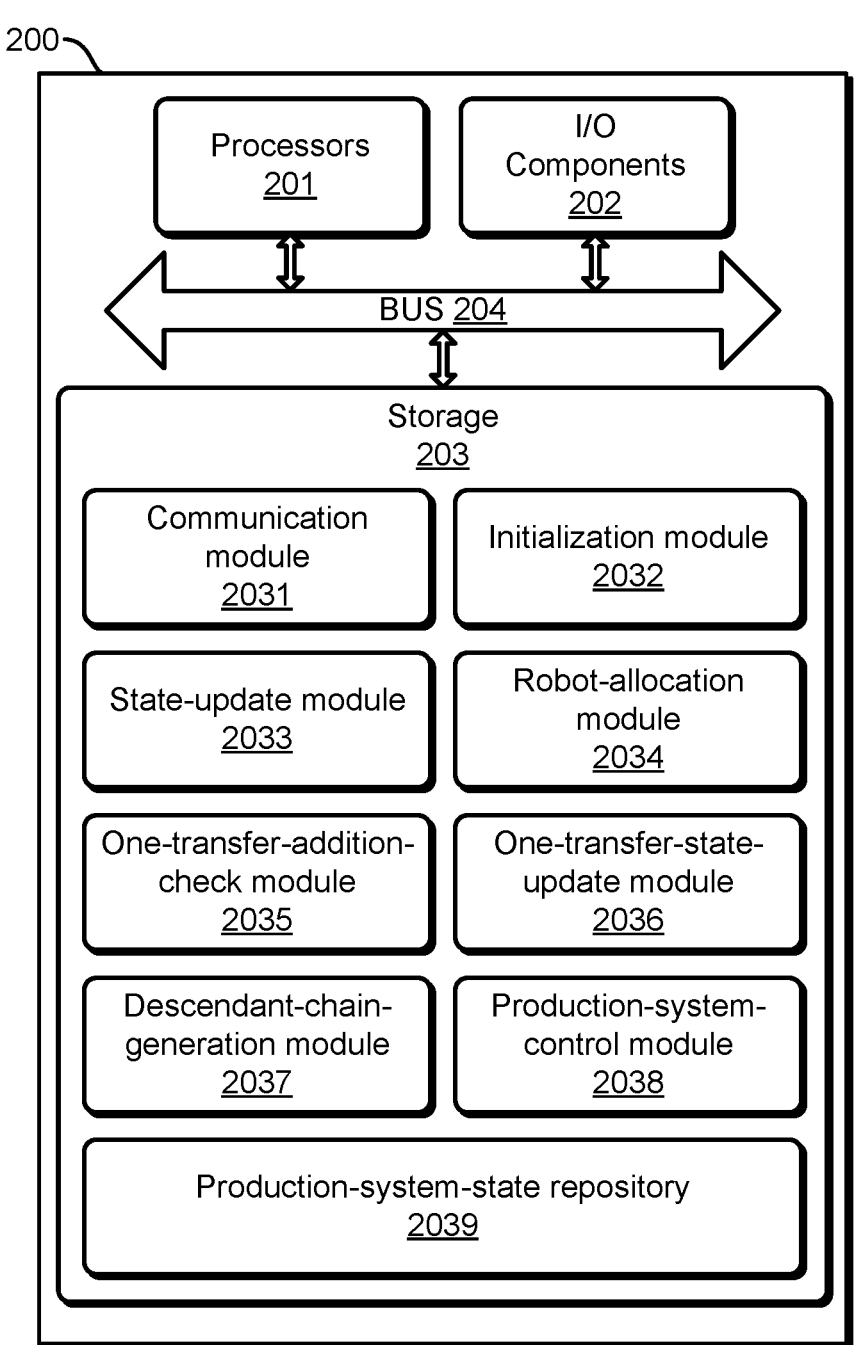
FIG. 16 is a schematic illustration of an example embodiment of a control device.

FIG. 16 is a schematic illustration of an example embodiment of a control device 200. The control device 200 includes one or more processors 201, one or more I/O components 202, and storage 203. Also, the hardware components of the control device 200 communicate via one or more buses 204 or other electrical connections. Examples of buses 204 include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 201 include one or more central processing units (CPUs), such as microprocessors (e.g., a single core microprocessor, a multi-core microprocessor); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). And the one or more processors 201 are an example of a processing unit.

The I/O components 202 include communication components (e.g., a GPU, a network-interface controller) that enable communication (wired or wireless) with other members of the MMPS 10 (e.g., the transfer robots 120, the production-system machines), with other computing devices, and with input or output devices (not illustrated), which may include a network device, a keyboard, a mouse, a printing device, a display device, a light pen, an optical-storage device, a scanner, a microphone, a drive, a joystick, and a control pad.

The storage 203 includes one or more computer-readable storage media. As used herein, a computer-readable storage medium is a computer-readable medium that includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 203, which may include both ROM and RAM, can store computer-readable data or computer-executable instructions. Furthermore, in embodiments where the storage 203 includes RAM, the one or more processors 201 can use the RAM as a work area. Also, the storage 203 is an example of a storage unit. Additionally, when the control device 200 is described as obtaining, recording, generating, storing, operating, processing, etc., the information is stored in the storage 203. For example, the storage 203 in FIG. 16 includes a production-system-state repository 2039, which is where production-system descriptions, process descriptions, production-system states (e.g., the states of transfer robots, the states of production-system machines, the states of workpieces), and transfer jobs are stored.

The control device 200 additionally includes a communication module 2031, an initialization module 2032, a state-update module 2033, a robot-allocation module 2034, a one-transfer-addition-check module 2035, a one-transfer-state-update module 2036, a descendant-chain-generation module 2037, and a production-system-control module 2038. A module includes logic, computer-readable data, or computer-executable instructions. In the embodiment shown in FIG. 16, the modules are implemented in software (e.g., Assembly, C, C++, C #, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 203. Also, in some embodiments, the control device 200 includes additional or fewer modules, the modules are combined into fewer modules, or the modules are divided into more modules. And a module may use (e.g., call) other modules.

The communication module 2031 includes instructions that cause the applicable components (e.g., the one or more processors 201, the I/O components 202, the storage 203) of the control device 200 to communicate with one or more other devices, such as other computing devices, other members of the MMPS 10, and input or output devices (e.g., display devices).

The initialization module 2032 includes instructions that cause the applicable components (e.g., the one or more processors 201, the I/O components 202, the storage 203) of the control device 200 to obtain production-system descriptions, obtain process descriptions, initialize the states of production systems (includes the states of the production-system machines and transfer robots), and obtain time steps. For example, some embodiments of the initialization module 2032 include instructions that cause the applicable components of the control device 200 to perform at least part of the operations that are described in blocks B205-B220 in FIG. 2 and in blocks B1303-B1310 in FIG. 13. And the applicable components operating according to the initialization module 2032 realize an example of an initialization unit.

The state-update module 2033 includes instructions that cause the applicable components (e.g., the one or more processors 201, the I/O components 202, the storage 203) of the control device 200 to update the states of the production-system machines or the states of the transfer robots. For example, some embodiments of the state-update module 2033 include instructions that cause the applicable components of the control device 200 to perform at least part of the operations that are described in block B245 in FIG. 2, in blocks B603-B650 in FIG. 6, in blocks B702-B770 in FIG. 7, and in block B1318 in FIG. 13. And the applicable components operating according to the state-update module 2033 realize an example of a state-update unit.

The robot-allocation module 2034 includes instructions that cause the applicable components (e.g., the one or more processors 201, the I/O components 202, the storage 203) of the control device 200 to generate transfer jobs for transfer robots. For example, some embodiments of the state-update module 2033 include instructions that cause the applicable components of the control device 200 to perform at least part of the operations that are described in blocks B230-B240 in FIG. 2 and in blocks B805-B880 in FIG. 8. And the applicable components operating according to the robot-allocation module 2034 realize an example of a robot-allocation unit.

The one-transfer-addition-check module 2035 includes instructions that cause the applicable components (e.g., the one or more processors 201, the I/O components 202, the storage 203) of the control device 200 to perform one-transfer-addition checks. For example, some embodiments of the one-transfer-addition-check module 2035 include instructions that cause the applicable components of the control device 200 to perform at least part of the operations that are described in block B845 in FIG. 8 and in blocks B1005-B1055 in FIG. 10. And the applicable components operating according to the one-transfer-addition-check module 2035 realize an example of a one-transfer-addition-check unit.

The one-transfer-state-update module 2036 includes instructions that cause the applicable components (e.g., the one or more processors 201, the I/O components 202, the storage 203) of the control device 200 to perform one-transfer-state updates. For example, some embodiments of the one-transfer-state-update module 2036 include instructions that cause the applicable components of the control device 200 to perform at least part of the operations that are described in blocks B1025 and B1040 in FIG. 10 and in blocks B1102-B1172 in FIG. 11. And the applicable components operating according to the one-transfer-state-update module 2036 realize an example of a one-transfer-state-update unit.

The descendant-chain-generation module 2037 includes instructions that cause the applicable components (e.g., the one or more processors 201, the I/O components 202, the storage 203) of the control device 200 to generate (e.g., recursively generate) descendant transfer chains of a transfer task, to delete descendant transfer chains that violate one or more conditions, and to select a descendant transfer chain from a plurality of descendant transfer chains. For example, some embodiments of the descendant-chain-generation module 2037 include instructions that cause the applicable components of the control device 200 to perform at least part of the operations that are described in blocks B858, B865, and B870 in FIG. 8 and in blocks B1205-B1210 (which includes blocks B1215-B1285) in FIG. 12. And the applicable components operating according to the descendant-chain-generation module 2037 realize an example of a descendant-chain-generation unit.

The production-system-control module 2038 includes instructions that cause the applicable components (e.g., the one or more processors 201, the I/O components 202, the storage 203) of the control device 200 to control the members of a production system, such as production-system machines and transfer robots, to operate according to a schedule, which includes one or more transfer jobs. For example, some embodiments of the production-system-control module 2038 include instructions that cause the applicable components of the control device 200 to perform at least part of the operations that are described in block B250 in FIG. 2 and in blocks B1313-B1323 in FIG. 13. And the applicable components operating according to the production-system-control module 2038 realize an example of a production-system-control unit.

Figure 17:
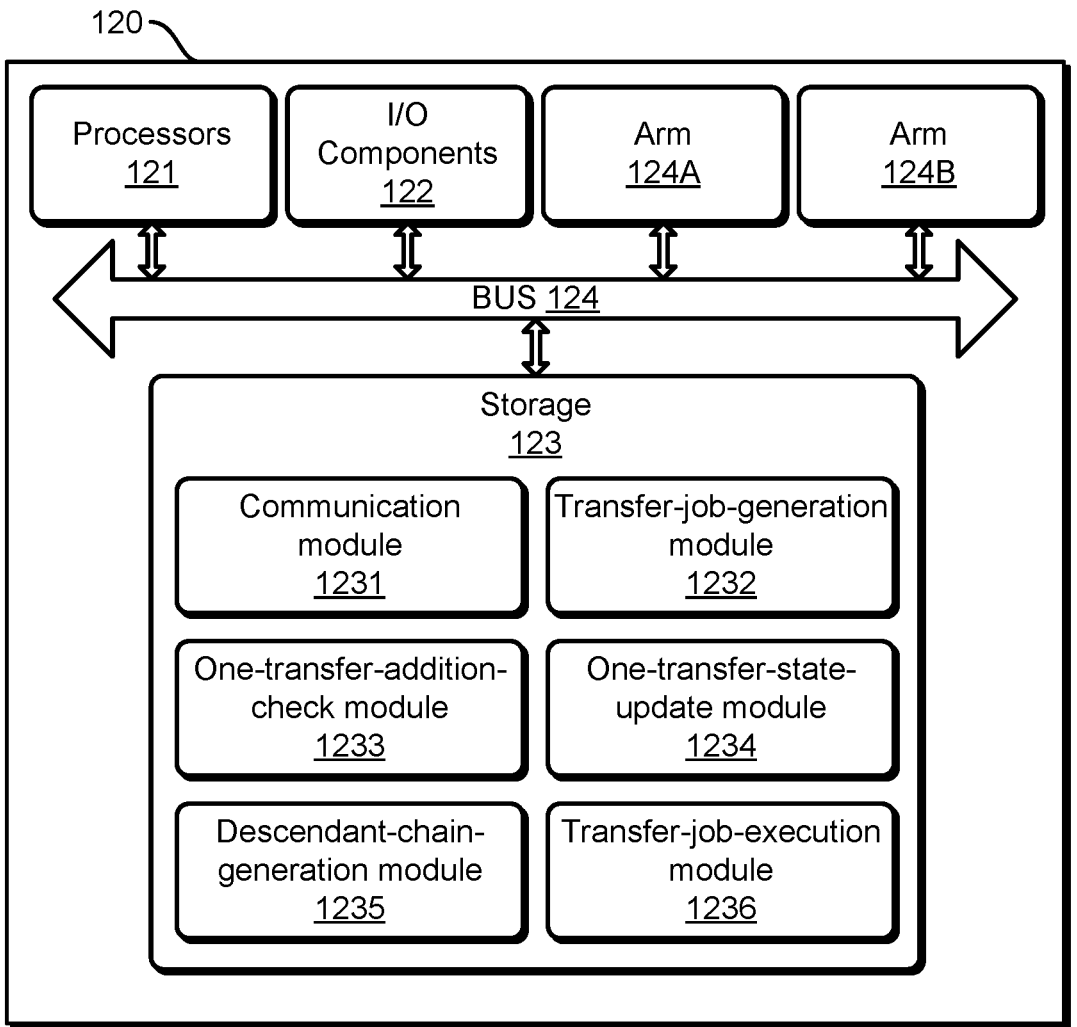
FIG. 17 is a schematic illustration of an example embodiment of a transfer robot.

FIG. 17 is a schematic illustration of an example embodiment of a transfer robot 120. The transfer robot 120 includes one or more processors 121, one or more I/O components 122, storage 123, a first arm 124A, and a second arm 124B. Also, the hardware components of the transfer robot 120 communicate via one or more buses 124 or other electrical connections.

Furthermore, in embodiments where the storage 123 includes RAM, the one or more processors 121 can use the RAM as a work area. Additionally, when the transfer robot 120 is described as obtaining, recording, generating, storing, operating, processing, etc., the information is stored in the storage 123.

The storage 123 also includes a communication module 1231, a transfer-job-generation module 1232, a one-transfer-addition-check module 1233, a one-transfer-state-update module 1234, a descendant-chain-generation module 1235, and a transfer-job-execution module 1236.

The communication module 1231 includes instructions that cause the applicable components (e.g., the one or more processors 121, the I/O components 122, the storage 123) of the transfer robot 120 to communicate with one or more other devices, such as a control device 200 and other members of the MMPS 10.

The transfer-job-generation module 1232 includes instructions that cause the applicable components (e.g., the one or more processors 121, the I/O components 122, the storage 123) of the transfer robot 120 to generate transfer jobs. For example, some embodiments of the transfer-job-generation module 1232 include instructions that cause the applicable components of the transfer robot 120 to perform at least part of the operations that are described in block B1353 in FIG. 13 and in blocks B1405-B1470 in FIG. 14. And the applicable components operating according to the transfer-job-generation module 1232 realize an example of a transfer-job-generation unit.

The one-transfer-addition-check module 1233 includes instructions that cause the applicable components (e.g., the one or more processors 121, the I/O components 122, the storage 123) of the transfer robot 120 to perform one-transfer-addition checks. For example, some embodiments of the one-transfer-addition-check module 1233 include instructions that cause the applicable components of the transfer robot 120 to perform at least part of the operations that are described in blocks B1005-B1055 in FIG. 10 and in block B1430 in FIG. 14. And the applicable components operating according to the one-transfer-addition-check module 1233 realize an example of a one-transfer-addition-check unit.

The one-transfer-state-update module 1234 includes instructions that cause the applicable components (e.g., the one or more processors 121, the I/O components 122, the storage 123) of the transfer robot 120 to perform one-transfer-state updates. For example, some embodiments of the one-transfer-state-update module 1234 include instructions that cause the applicable components of the transfer robot 120 to perform at least part of the operations that are described in blocks B1025 and B1040 in FIG. 10 and in blocks B1102-B1172 in FIG. 11. And the applicable components operating according to the one-transfer-state-update module 1234 realize an example of a one-transfer-state-update unit.

The descendant-chain-generation module 1235 includes instructions that cause the applicable components (e.g., the one or more processors 121, the I/O components 122, the storage 123) of the transfer robot 120 to generate (e.g., recursively generate) descendant transfer chains of a transfer task, to delete descendant transfer chains that violate one or more conditions, and to select a descendant transfer chain from a plurality of descendant transfer chains. For example, some embodiments of the descendant-chain-generation module 1235 include instructions that cause the applicable components of the transfer robot 120 to perform at least part of the operations that are described in blocks B1205-B1210 (which includes blocks B1215-B1285) in FIG. 12 and in blocks B1445, B1460, and B1465 in FIG. 14. And the applicable components operating according to the descendant-chain-generation module 1235 realize an example of a descendant-chain-generation unit.

The transfer-job-execution module 1236 includes instructions that cause the applicable components (e.g., the one or more processors 121, the I/O components 122, the storage 123) of the transfer robot 120 to control the arms 124, to perform transfer jobs (the transfer tasks in transfer jobs), and to update the state of the production system while performing a transfer job. For example, some embodiments of the transfer-job-execution module 1236 include instructions that cause the applicable components of the transfer robot 120 to perform at least part of the operations that are described in block 1355 in FIG. 13 and in blocks B1503-B1565 in FIG. 15. And the applicable components operating according to the transfer-job-execution module 1236 realize an example of a transfer-job-execution unit.

Figure 18:
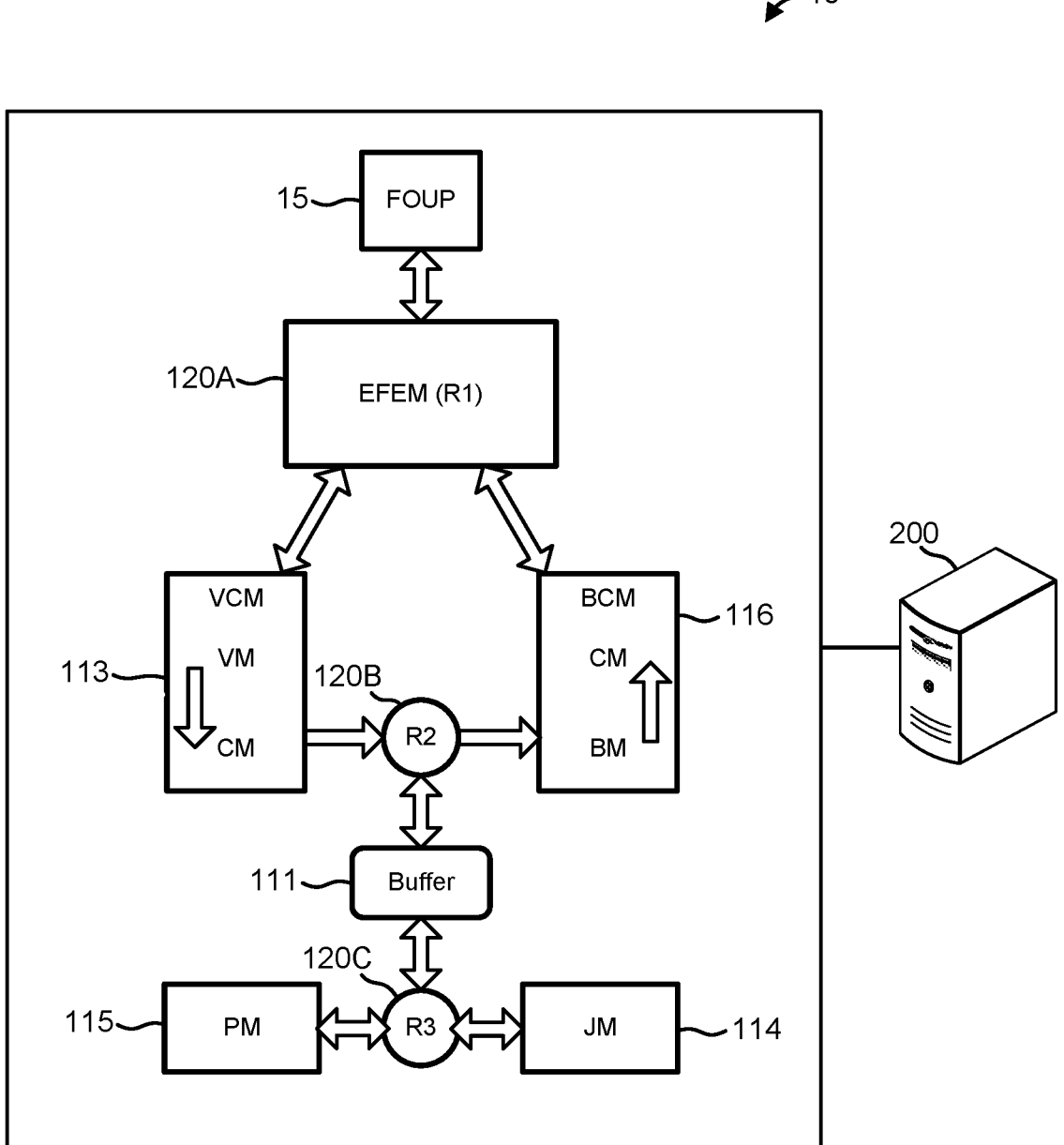
FIG. 18 illustrates an example embodiment of a multi-machine production system (MMPS).

FIG. 18 illustrates an example embodiment of a multi-machine production system (MMPS) 10. The MMPS 10 includes production-system machines, transfer robots 120 (robots R1, R2, and R3), and at least one control device 200. The MMPS 10 may also be an MMMPPS.

In this embodiment, the production-system machines include the following: a buffer 111, one or more vapor-cooling machines (VCMs) 113, at least one jetting machine (JM) 114, one or more planarization machines (PMs) 115, and one or more baking-cooling machines (BCMs) 116.

Also, transfer robot R1 (120A) is an EFEM, which can load and unload workpieces from a FOUP 15. Furthermore, transfer robot R1 (120A) can load the one or more VCMs 113 and unload the one or more BCMs 116. And transfer robot R3 (120B) loaded and unloads the at least one JM 114 and the one or more PMs 115. And the buffer 111 may be a PA/B.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

Definitions

In the description, specific details are set forth in order to provide a thorough understanding of the embodiments disclosed. However, well-known methods, procedures, components and circuits may not have been described in detail in order to avoid unnecessarily lengthening the present disclosure.

Also, if a member (e.g., element, part, component) is referred herein as being "on," "against," "connected to," or "coupled to" another member, then the member can be directly on, against, connected or coupled to the other member, but intervening members may also be present between the member and the other member. In contrast, if a member is referred to as being "directly on," "directly against," "directly connected to," or "directly coupled to" another member, then there are no intervening members present between the member and the other member.

Furthermore, the terms "comprising," "having," "includes," "including," and "containing" are to be construed as open-ended terms unless otherwise noted. Accordingly, these terms, when used in the present specification, specify the presence of described features, integers, steps, operations, elements, materials, or members, but do not preclude the presence or addition of one or more other features, integers, steps, operations, elements, materials, or members that are not explicitly described.

The invention claimed is:

1. A method of generating a schedule for a plurality of machines and robots, the method comprising:

receiving a production-system description that describes respective operations that can be performed on workpieces by each of a plurality of machines and that describes capabilities of one or more robots to transfer the workpieces to and from each of the plurality of machines;

receiving a process description that describes at least one sequence of process operations to be performed on a workpiece;

constructing a plurality of transfer chains by recursively generating transfer chains based on a production-system state, the process description, and on the production-system description, wherein the plurality of transfer chains include a parent transfer chain and one or more child transfer chains that were recursively generated from the parent transfer chain, wherein the production-system state describes, at a respective point in time in a series of points in time, a respective state of each machine of the plurality of machines, a respective state of each robot of the one or more robots, and a respective state of each workpiece that is held by either a robot of the one or more robots or a machine of the plurality of machines; and selecting a particular transfer chain of the plurality of transfer chains based on one or more selection criteria.

2. The method of claim 1, wherein the workpieces are wafers, and wherein the respective operations that can be performed on workpieces by each of the plurality of machines are semiconductor-fabrication operations.

3. The method of claim 1, wherein the one or more selection criteria include the longest transfer chain in the plurality of transfer chains.

4. The method of claim 1, wherein the one or more selection criteria include minimizing a standard deviation of a dwell time between depositing formable material on each workpiece and planarizing the formable material.

5. The method of claim 1, wherein the one or more selection criteria include minimizing the duration of the particular transfer chain.

6. The method of claim 1, wherein the respective state of each machine of the plurality of machines includes one of the following operating statuses: idle, operating on a workpiece, and finished operating on a workpiece and waiting for the workpiece to be unloaded; and wherein the respective state of each robot of the one or more robots includes one of the following operating statuses: idle, moving toward one of the plurality of machines, unloading a workpiece from one of the plurality of machines, and loading a workpiece onto one of the plurality of machines.

7. The method of claim 1, wherein each transfer chain of the plurality of transfer chains includes a respective sequence of transfer tasks, wherein recursively generating the transfer chains includes repeatedly generating a transfer task for a respective transfer chain, of the transfer chains, and then generating all valid transfer tasks that can follow the transfer task in the respective transfer chain.

8. The method of claim 1, wherein constructing the plurality of transfer chains and selecting the particular transfer chain are performed while the machines are operating on workpieces.

9. The method of claim 1, wherein the parent transfer chain includes a sequence of transfer tasks, and wherein each child transfer chain, of the one or more child transfer chains, includes the sequence of transfer tasks and one or more respective additional transfer tasks that follow the first sequence of transfer tasks.

10. A system for operating on workpieces, the system comprising:
a plurality of machines that are configured to operate on workpieces;
a plurality of transfer robots, wherein each transfer robot of the plurality of transfer robots respectively comprises one or more transfer arms that are each configured to carry the workpieces;
one or more memories; and
one or more processors, wherein the one or more processors and the one or more memories are configured to
obtain a production-system description that describes respective operations that can be performed on the workpieces by each of the plurality of machines and that describes capabilities of the plurality of robots to transfer the workpieces to and from each of the plurality of machines;

obtain a process description that describes at least one sequence of process operations to be performed on a workpiece;
generate a first plurality of transfer chains based on a first production-system state, the process description, and on the production-system description, wherein each transfer chain of the first plurality of transfer chains includes a respective sequence of transfer tasks, wherein generating the first plurality of transfer chains includes recursively performing a transfer-task-addition process in which an instance of the transfer-task-addition process invokes another instance of the transfer-task-addition process, wherein the first production-system state describes, at a first point in time, a respective state of each machine of the plurality of machines, a respective state of each robot of the plurality of robots, and a respective state of each workpiece that is held by either a robot of the one or more robots or a machine of the plurality of machines; and
select a first particular transfer chain of the first plurality of transfer chains based on one or more selection criteria.

11. The system of claim 10, wherein the one or more processors and the one or more memories are further configured to:
generate a second plurality of transfer chains by recursively generating transfer chains based on a second production-system state, the process description, and on the production-system description, wherein the second production-system state describes, at a second point in time after the first point in time of the first production-system state, a respective state of each machine of the plurality of machines, a respective state of each robot of the plurality of robots, and a respective state of each workpiece that is held by either a robot of the one or more robots or a machine of the plurality of machines; and
select a second particular transfer chain of the second plurality of transfer chains based on the one or more selection criteria.

12. The system of claim 11, wherein the one or more selection criteria include maintaining a constant workpiece-transfer time from a first machine to a second machine of the plurality of machines.

13. The system of claim 10, wherein the capabilities of the plurality of robots to transfer workpieces to and from each of the plurality of machines indicates, for each transfer arm of each robot of the plurality of robots, the machines of the plurality of machines that can be loaded and unloaded by the transfer arm.

14. The system of claim 10, wherein the first plurality of transfer chains forms a tree of transfer tasks.

15. The system of claim 10, wherein the one or more processors and the one or more memories are further configured to:
control a transfer robot of the plurality of transfer robots to execute the respective sequence of transfer tasks in the first particular transfer chain.

16. The system of claim 10, wherein the one or more selection criteria include one or more of the following: the longest transfer chain in the first plurality of transfer chains, minimizing a standard deviation of a dwell time between depositing formable material on each workpiece and planarizing the formable material, minimizing the duration of the particular transfer chain.

17. A method of generating a schedule for a transfer robot, the method comprising:

obtaining a production-system description that describes respective operations that can be performed on workpieces by each of a plurality of machines and that describes capabilities of one or more robots to transfer the workpieces to and from each of the plurality of machines, wherein the one or more robots include a first robot;

obtaining a process description that describes at least one sequence of process operations to be performed on workpieces;

generating a future production-system state based on the process description and on the production-system description, wherein the future production-system state describes, at a future point in time, a respective state of each machine of the plurality of machines, a respective state of each robot of the one or more robots, and a respective state of each workpiece that is held by either a robot of the one or more robots or a machine of the plurality of machines;

generating a plurality of transfer chains for the first robot based on the future production-system state, on the process description, and on the production-system description, and on respective future states of the first robot in the plurality of transfer chains, wherein each transfer chain of the plurality of transfer chains includes a respective sequence of transfer tasks, and wherein the plurality of transfer chains include a first transfer chain and a second transfer chain that share at least one transfer task; and selecting a particular transfer chain of the plurality of transfer chains based on one or more selection criteria.

18. The method of claim 17, wherein generating a transfer chain of the plurality of transfer chains includes generating a first transfer task, determining a future state of the first robot upon the completion of the first transfer task, and generating all valid transfer tasks that can follow the first transfer task based on the future state of the first robot, on the respective states of machines of the plurality of machines that are reachable by the first robot, and on the respective state of each workpiece that is held by either the first robot of the one or more robots or the machines of the plurality of machines that are reachable by the first robot.

19. The method of claim 17, wherein generating a transfer chain of the plurality of transfer chains includes:

obtaining a parent transfer task; and performing instances of a transfer-task generation process that includes:

(a) determining a future state of the first robot upon the completion of the parent transfer task; and (b) generating all valid child transfer tasks that can follow the parent transfer task based on the future state of the first robot, the respective states of machines of the plurality of machines that are reachable by the first robot, and the respective state of each workpiece that is held by either the first robot of the one or more robots or the machines of the plurality of machines that are reachable by the first robot, wherein the instances of the transfer-task generation process include, for each valid child transfer task of the valid child transfer tasks generated in (b), a respective instance of the transfer-task generation process that uses the valid child transfer task as the parent transfer task.

20. The method of claim 17, wherein the particular transfer chain includes a scheduled time period of execution, and wherein the method further comprises:

marking any machine of the plurality of machines with which the first robot is scheduled to perform a transfer task included in the particular transfer chain as blocked for the scheduled time period of execution.

* * * * *